United States Patent
Garner et al.

(10) Patent No.: US 8,130,184 B2
(45) Date of Patent: Mar. 6, 2012

(54) IMAGE PIXEL TRANSFORMATION

(75) Inventors: Grant K. Garner, Albany, OR (US);
Masoud K. Zavarehi, Albany, OR (US);
Roshan B. Baliga, Corvallis, OR (US)

(73) Assignee: Hewlett-Packard Development Company L. P., Houston, TX (US)

( * ) Notice: Subject to any disclaimer, the term of this patent is extended or adjusted under 35 U.S.C. 154(b) by 1826 days.

(21) Appl. No.: 11/255,514

(22) Filed: Oct. 21, 2005

(65) Prior Publication Data
US 2007/0091433 A1    Apr. 26, 2007

(51) Int. Cl.
*G09G 3/34* (2006.01)
(52) U.S. Cl. ......... 345/84; 345/207; 345/690; 348/739; 348/744; 353/85; 359/443; 359/459
(58) Field of Classification Search ............ 345/591, 345/593, 30, 55, 84, 87–104, 207, 690; 353/85; 348/207, 739, 744; 359/443, 459
See application file for complete search history.

(56) References Cited

U.S. PATENT DOCUMENTS

| | | | |
|---|---|---|---|
| 3,813,686 A | 5/1974 | Mierzwinski | |
| 4,999,711 A | 3/1991 | Paulin | |
| 5,075,789 A | 12/1991 | Jones et al. | |
| 5,394,167 A | 2/1995 | Migny | |
| 5,748,802 A | 5/1998 | Winkelman | |
| 5,812,286 A | 9/1998 | Lin | |
| 5,847,784 A | 12/1998 | Finnila et al. | |
| 5,870,505 A | 2/1999 | Wober et al. | |
| 5,926,562 A | 7/1999 | Hyodo et al. | |
| 6,340,976 B1 | 1/2002 | Oguchi et al. | |
| 6,529,212 B2 | 3/2003 | Miller et al. | |
| 6,558,006 B2 | 5/2003 | Ioka | |
| 6,570,546 B1 | 5/2003 | Welker et al. | |
| 6,618,115 B1 | 9/2003 | Hiroki | |
| 6,727,489 B2 | 4/2004 | Yano | |
| 6,804,406 B1 | 10/2004 | Chen | |
| 6,814,448 B2 | 11/2004 | Ioka | |
| 6,826,310 B2 | 11/2004 | Trifonov et al. | |
| 6,853,486 B2 | 2/2005 | Cruz-Uribe et al. | |
| 2002/0071036 A1* | 6/2002 | Gonzales et al. | 348/207 |
| 2003/0012437 A1 | 1/2003 | Zaklika et al. | |
| 2003/0020836 A1 | 1/2003 | Kobayashi | |
| 2003/0156229 A1 | 8/2003 | Samman et al. | |
| 2003/0193566 A1 | 10/2003 | Matsuda et al. | |
| 2004/0012849 A1* | 1/2004 | Cruz-Uribe et al. | 359/449 |
| 2005/0057803 A1 | 3/2005 | Cruz-Uribe et al. | |
| 2005/0100242 A1 | 5/2005 | Trifonov et al. | |
| 2005/0168813 A1 | 8/2005 | Benning et al. | |
| 2005/0179706 A1 | 8/2005 | Childers | |
| 2006/0279477 A1* | 12/2006 | Allen et al. | 345/30 |
| 2007/0081130 A1* | 4/2007 | May et al. | 353/85 |
| 2007/0081239 A1* | 4/2007 | May et al. | 359/443 |

FOREIGN PATENT DOCUMENTS

| EP | 1 365 600 A2 | 11/2003 |
|---|---|---|
| EP | 1 457 963 A | 9/2004 |

* cited by examiner

*Primary Examiner* — Lun-Yi Lao
*Assistant Examiner* — Insa Sadio

(57) ABSTRACT

Various embodiments for image pixel transformation are disclosed.

32 Claims, 9 Drawing Sheets

```
                                    ← 820

┌─────────────────────────────┐
        │   REDUCE DISPLAY BRIGHTNESS │
        │   RANGES OF ADJACENT SCREEN │─ 822
        │   REGION QUADRANTS TO BE    │
        │     MUTUALLY COEXTENSIVE    │
        └──────────────┬──────────────┘
                       ↓
        ┌─────────────────────────────┐
        │   ADJUST LUMINANCE VALUES OF│─ 824
        │   IMAGE PIXELS FOR BLENDING │
        └─────────────────────────────┘
```

IMAGE PIXEL TRANSFORMATION

Display systems may utilize a projector to project an image onto a screen. In some instances, the screen may have regions with different reflectivities. As a result, the projected image may have visual artifacts along the boundaries of such regions.

DETAILED DESCRIPTION OF THE EXAMPLE EMBODIMENTS

Figure 1:
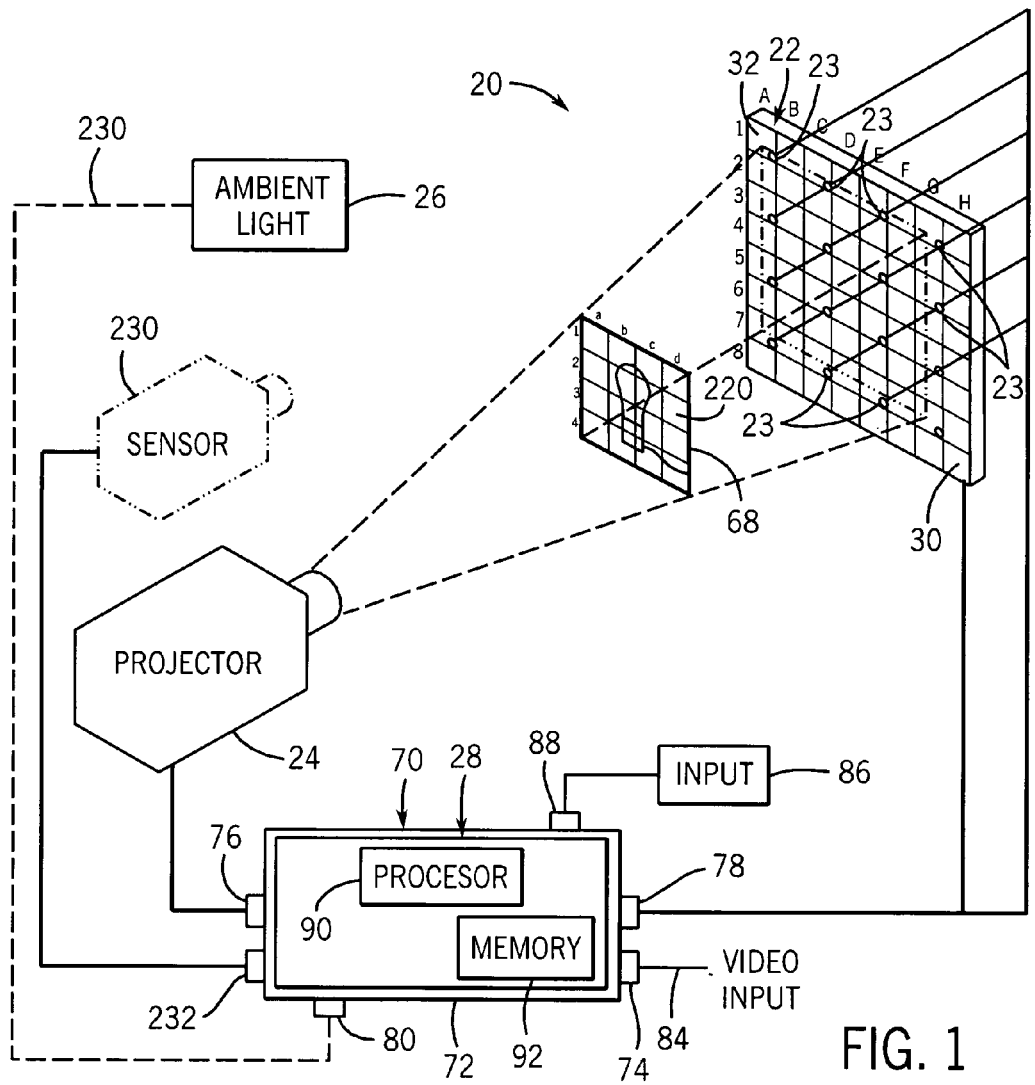
FIG. 1 is a schematic illustration of an example projection system according to an example embodiment.

FIG. 1 schematically illustrates one example of a projection system 20 which is configured to partition a projection area into distinct blocks of pixels and to align such blocks with corresponding regions of a screen that have been actuated to distinct reflectivities. As will be described in detail hereafter, projection system 20 further assigns distinct reflectivities to the screen regions and performs distinct image processing to blocks and makes distinct adjustments to pixels within different blocks based upon the assigned reflectivities of the regions. In addition, projection system 20 blends display brightness levels across the screen for enhanced viewing. In other embodiments, projection system 20 may perform less than each of these aforementioned functions or may perform additional functions.

Projection system 20 generally includes screen 22, sensors 23, projector 24, ambient light source 26, and controller 28. Screen 22 constitutes a structure having a surface 30 configured to be actuated to different reflectivities or reflective states. In a particular example illustrated, surface 30 of screen 22 includes multiple regions 32-1A to 32-8H (collectively referred to as regions 32) which are configured to be selectively actuated to distinct reflective states from one another, enabling screen 22 to adjust to and accommodate different ambient lighting conditions or different image characteristics. Although screen 22 is illustrated as including 64 such distinct regions 32, screen 22 may alternatively include a greater or fewer number of such regions or patches which are actuatable to distinct reflectivities.

Figure 2:
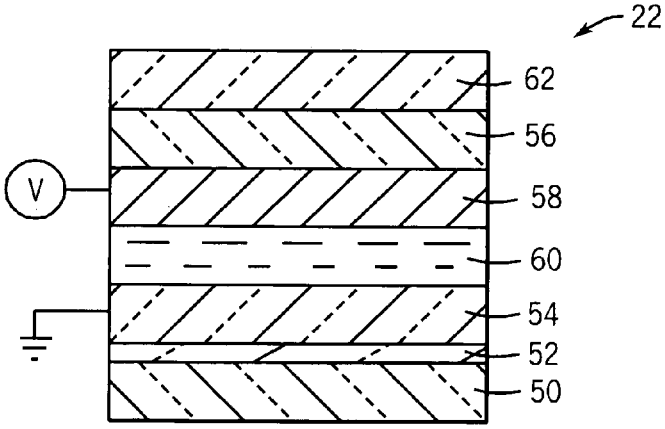
FIG. 2 is a sectional view of a portion of one example of a screen of the projection system of FIG. 1 according to an example embodiment.

FIG. 2 is a sectional view of one example of a region 32 of screen 22. As shown by FIG. 2, each region 32 of screen 22 includes back substrate 50, reflective layer 52, electrode 54, substrate 56, electrode 58, optical charge response material 60 and coating 62. Back substrate 50 serves as a support for reflective layer 52. In one embodiment, back substrate 50 constitutes a dielectric material such as silicon. In other embodiments, back substrate 50 may form other materials such as glass and the like.

Reflective layer 52 comprises a layer of visible light reflecting material supported by back substrate 50. According to one example embodiment, layer 52 is formed from aluminum. In other embodiments, layer 52 may be formed from other materials such as silver or other thin metal coatings.

Electrode 54 comprises a layer of electrically conductive material configured to be electrically charged so as to apply an electric field across optical charge responsive material 60. In the particular embodiment illustrated, electrode 54 is formed from a transparent or translucent electrically conductive material that overlies reflective layer 52. In one embodiment, electrode 54 may comprise a conductive material such is indium tin oxide (ITO) or polyethylene dioxythiophene (PEDOT). In other embodiments, electrode 54 may be formed from other transparent electrically conductive materials. In still other embodiments, electrode 54 may itself be formed from an electrically conductive reflective material such that reflective layer 52 may be omitted.

Front substrate 56 comprises a support structure for electrode 58. Front substrate 56 is formed from an optically transparent and clear dielectric material. In one embodiment, front substrate 56 may be formed from an optically clear and flexible dielectric material such as polyethylene terephalate (PET). In other embodiments, front substrate 56 may be formed from other transparent dielectric materials that may be inflexible such as glass.

Electrode 58 comprises a layer of transparent or translucent electrically conductive material formed upon substrate 56. Electrode 58 is configured to be charged so as to cooperate with electrode 54 so as to create an electric field across optical charge responsive material 60. In one embodiment, electrode 58 may constitute a transparent conductor such as ITO or PEDOT. In other embodiments, other transparent conductive materials may be used.

Optical charge responsive material 60 comprises a layer (sometimes referred to as an "active layer") of material configured to change its transparency and reflectivity in response to changes in an applied voltage or charge. In one embodiment, material 60 may change from a transparent clear state, allowing light to pass through material 60 to be reflected by reflective layer 52, to a generally opaque state in which light is absorbed or scattered by material 60. According to one embodiment, material 60 may comprise a dichroic dye doped polymer disbursed liquid crystal (PDLC) material in which pockets of liquid crystal material are disbursed throughout a transparent polymer layer. In other embodiments, material 60 may comprise other materials such as electrochromic material such as tungsten oxide, or photo chromic or electrophoretic material.

Coating 62 constitutes one or more layers deposited or otherwise formed upon substrate 56 opposite electrode 58. Coating 62 may comprise a front plane diffuser and may include an anti-reflection layer such as an anti-glare surface treatment, an ambient rejection layer, such as a plurality of optical band pass filters, or a series of micro lenses and/or partial diffuse layers. In other embodiments, coating 62 may be omitted.

In a particular example illustrated in FIG. 2, electrode 54 and electrode 58 have a time varying charge applied to them to create a time varying alternating electric field across optical charge responsive material 60 to vary its translucency so as to correspondingly vary the reflectivity. In the particular example illustrated, each of regions 32 includes an electrode 58 which is electrically isolated from electrodes 58 of other regions 32. By applying different voltages to electrodes 58 of different regions 32, the reflectivity of regions 32 across surface 30 of screen 22 may be controlled and varied. For example, region 32-1A may be provided with a first reflectivity by providing its electrode 58 with a first voltage while an adjacent region 32-2A is provided with a distinct reflectivity by applying a different voltage to electrode 58 of region 32-2A. In other embodiments, screen 22 may comprise other structures configured to be selectively actuated between different reflective states.

Referring once again to FIG. 1, sensors 23 constitute sensors configured to sense or detect electromagnetic radiation, such as visible light. In a particular example illustrated, sensors 23 are located upon or along surface 30 of screen 22 and are configured to sense light from ambient light source 26 impinging surface 30 as well as light from projector 24 impinging surface 30. Sensors 23 are mounted or otherwise fixed to screen 22 at predetermined locations with respect to regions 32. As a result, sensors 23 may be used to sense the projected area from projector 24 and to correlate or map the position of the projected area relative to regions 32. Sensors 23 may also be utilized to sense or detect light intensity values or brightness values of ambient light source 26 as well as a projection luminance range of projector 24. In one embodiment, sensors 23 may sense luminance and not other properties of the light impinging upon sensors 23, or, in other embodiments, they may sense color properties such as tristimulus values or RGB values.

In the particular example illustrated, sensors 23 include sixteen sensors 23 distributed across screen 22. In other embodiments, sensors 23 may include a greater or fewer number of such sensors which may be located at the same or alternative locations. In other embodiments, sensors 23 may constitute other sensing devices. In some embodiments, sensors 23 may be omitted. In the particular example illustrated, each of sensors 23 may constitute a commercially available device or a future developed device that is capable of producing an electrical signal proportional to the intensity of incident light. In one embodiment, each of sensors 23 is capable of detecting luminance, or, alternatively, is capable of detecting tristimulus values, x, y and z, where x and z are chrominance parameters and y is a luminance parameter. Examples of sensor 23 include a photo diode or photo transistor, either as a discrete component or built integral to screen 22. The output signal of each sensor 23 is transmitted to controller 28 for use by controller 28 in aligning projected image 68 to screen 22.

Projector 24 constitutes a device configured to project visual light towards surface 30 of screen 22 such that the incident of light is reflected from surface 30 and is viewable by an observer. Projector 24 may project either color or grayscale images. Projector 24 may use any available means to form the images.

Ambient light source 26 constitutes any source of ambient light for the environment of projector 24 and screen 22, whether natural or artificial. In one embodiment, ambient light source 26 may constitute one or more sources of light that emit visual light such as an incandescent light, a fluorescent light or one or more light emitting diodes. In yet other embodiments, ambient light source 26 may constitute one or more structures that facilitate transmission of light from a source through an opening or window having a source such as sunlight or other light. As indicated by broken lines 64, in some embodiments, ambient light source 26 may be in communication with controller 28, enabling controller 28 to control either the emission or transmission of light by ambient light source 26. In other embodiments, ambient light source 26 may alternatively operate independent of control by controller 28.

Controller 28 is associated with or in communication with the other components of system 20 and configured to direct or control the operation of screen 22 and projector 24. In some embodiments, controller 28 may be additionally configured to direct and control ambient light source 26. Controller 28 communicates with screen 22 and projector 24 via wire or radio link or optical link, and may use a different method for communicating with the screen and the projector. In one embodiment, controller 28 may be physically embodied as part of projector 24. In yet another embodiment, controller 28 may be physically embodied as part of screen 22. In still other embodiments, controller 28 may be physically embodied in separate units associated with both projector 24 and with screen 22. In yet other embodiments, controller 28 may be physically embodied as one or more separate units that may be selectively connected to screen 22 and projector 24.

In the embodiment illustrated, controller 28 generally includes processor 90 and memory 92. Processor 90 constitutes a processing unit configured to analyze input and to generate output to facilitate operation of projection system 20. For purposes of the disclosure, the term "processor unit"

shall include a presently available or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hardwired circuitry may be used in place of or in combination with software instructions to implement the functions described. Controller 28 is not limited to any specific combination of hardware circuitry and software, nor to any particular source for the instructions executed by the processing unit.

In the particular embodiment illustrated, processor 90 analyzes input such as input from input from sensors 23, input from projector 24, input from ambient light source 26 and video input 84. Video input 84 generally constitutes data or information pertaining to one or more images to be displayed by projection system 20. In particular, video input 84 includes data or information regarding individual pixels or portions of an image. In one embodiment, video input 84 may include a single frame of image data for a still image. In yet another embodiment, video input 84 may include information for multiple frames of image data for displaying multiple still images or displaying motion pictures or movies.

For each pixel, video input 84 includes a target luminance value T desired for the pixel. The target or ideal pixel luminance T is the amount of light desired to be reflected from a given pixel in the image from a lambertian screen in a dark room with no ambient light. Such target luminances $T_{ij}$ (for a pixel having coordinates i, j in an image) range from a zero or black value to a one or white value. In embodiments where at least portions of the image to be displayed by projection 20 are to be in color, video input 84 may additionally include information regarding color values for each pixel. For example, video input 84 may include information coded for the RGB or the $YC_bC_r$ video standards.

Video input 84 may be provided to controller 28 from various sources. For example, video input 84 may be transmitted to controller 28 wirelessly or through optical fiber or electrical wiring. Video input 84 may be transmitted to controller 28 from another external device configured to read image data from a storage medium such as a magnetic or optical tape, a magnetic or optical disc, a hardwired memory device or card or other form of persistent storage. Such image data may also alternatively be provided by another processor which generates such image data. In some embodiments, controller 28 itself may include a currently developed or future developed mechanism configured to read image data from a portable memory containing such image data such as a memory disc, memory tape or memory card.

According to one embodiment, controller 28 is physically embodied as a self-contained unit 70. For example, in one embodiment, controller 28 may be physically embodied as a box which may be connected to screen 22 and projector 24. In such an embodiment, controller 28 may be replaced or upgraded without corresponding replacement of screen 22 or projector 24. In such an embodiment, controller 28 may be provided as an upgrade to existing screens 22 or existing projectors 24 to facilitate enhanced projection quality.

In the embodiment illustrated, unit 70 includes a housing or enclosure 72, and external interfaces 74, 76, 78, and 80. Housing 72 surrounds and contains the electronic components of controller 28.

Interfaces 74-80 facilitate communication between controller 28, contained within housing 72, and external devices. In a particular embodiment illustrated, processor 90 is in communication with each of interfaces 74-80. Such interfaces 74-80 are configured to facilitate both the reception of information from and the communication of information to external devices. In a particular embodiment illustrated, interface 74 is configured to receive video input 84 for processing by controller 28. Interface 76 is further configured to facilitate communication of information to projector 24. In one embodiment, interface 76 is specifically configured to facilitate communication of projection luminances P or P' of image pixels to projector 24.

Interface 78 is configured to facilitate communication between controller 28 and one or both of screen 22 and sensors 23. In one embodiment, interface 78 is specifically configured to facilitate communication of selected reflectivities to screen 22 for its different regions 32.

Interface 80 is configured to facilitate communication between controller 28 and ambient light source 26. In one embodiment, interface 80 facilitates communication of control signals from controller 28 to ambient light source 26 to control provision of ambient light by ambient light source 26. In some embodiments where control of ambient light source 26 is not exercised, interface 80 may be omitted.

As further shown by FIG. 1, in one embodiment, projection system 20 may additionally include input 86 configured to facilitate input of instructions or information to controller 28 by an observer or operator of system 20. For example, input 86 may be utilized to facilitate input of an ambient light value which may be used by controller 28 in lieu of sensed ambient light values otherwise provided by sensors 23 or other sensors. Input 86 may constitute a keyboard, mouse, touch pad touch screen, one or more buttons, switches, and voice recognition or voice recognition software and the like. In the particular embodiment shown, input 86 communicates with processor 90 of controller 28 via external interface 88 along housing 72. In other embodiments, input 86 may be physically incorporated into housing 72. In other embodiments, input 86 and interface 88 may be omitted.

In the particular embodiment shown, interface 74-80 and 88 constitute outlets or plugs supported by housing 72 along external faces of housing 72 along one or more external faces of housing 72, wherein the outlets or plugs mate with corresponding electrical wires or optical fibers associated with external devices. In yet other embodiments, interfaces 74-80 and 88 may include wireless receivers or transmitters configured to facilitate wireless communication with external devices. In embodiments where controller 28 is incorporated as part of projector 24 or as part of screen 22, housing 72 and interfaces 74-80 may be omitted.

Memory 92 constitutes one or more computer readable mediums configured to store and contain information or data such as instructions for directing the operation of processor 90. In one embodiment, memory 92 contains written instructions for directing processor 92 to analyze information from screen 22, projector 24 and ambient light source 26. In one embodiment, memory 92 may serve as a frame buffer for storing analyzed or adjusted image data prior to such information being further analyzed or being transmitted to projector 24. In one embodiment, memory 92 further contains instructions for directing processor 90 to generate controls based upon the analysis of such information, wherein screen 22, projector 24 and ambient light source 26 operate in a desired manner in response to such control signals.

Figure 3:
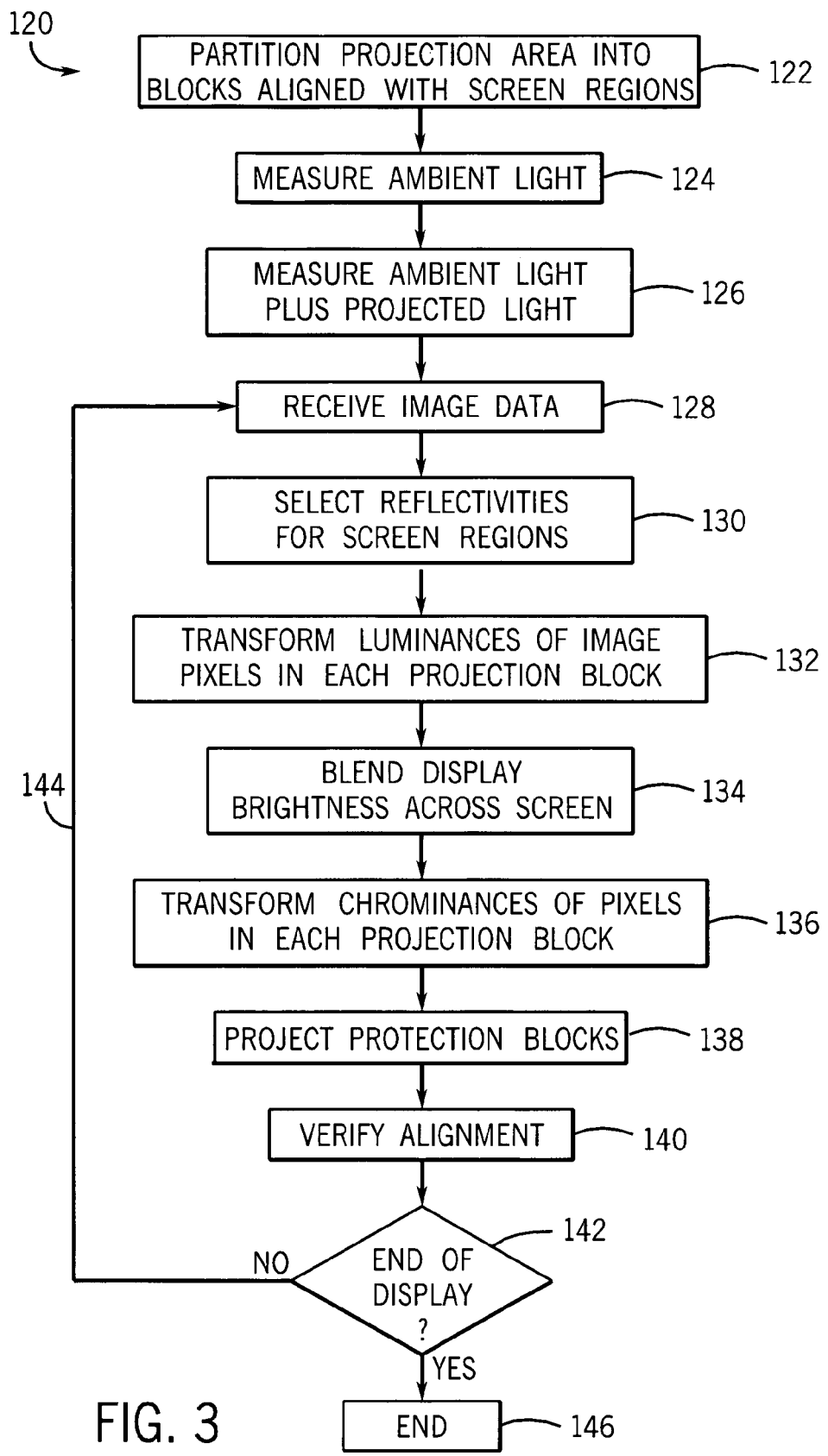
FIG. 3 is a flow diagram of one example of a method of operation of the projection system of FIG. 1 according to an example embodiment.

FIG. 3 is a flow diagram illustrating one example of a method 120 of operation of project system 20. In step 122, processor 90, following instructions contained in memory 92, partitions the projection area 68 into blocks 220-1a through 220-8b (collectively referred to as image blocks 220) (some of which are shown in FIG. 1). In one embodiment, such partitioning is formed using information received from sensors 23. In another embodiment, such partitioning is performed using information received from sensor 230. Such image blocks 220 correspond to regions 32 of screen 22. In particular, one or more of the boundaries of each image block 220 correspond to boundaries of regions 32. As further indicated by step 122 in FIG. 3, controller 28 further aligns such image blocks 220 with their associated screen regions 32. As a result, each image block 220 may be independently adjusted or transformed based upon a reflectivity and/or ambient light value of its corresponding or associated screen region 32. For example, image block 220-2c may be adjusted based upon the reflectivity and/or ambient light level associated with this corresponding screen region 32-2C. Likewise, image block 2204d may be adjusted or transformed differently than image block 220-2c based upon screen region 32-4D. Consequently, different ambient light levels across screen 22 may be compensated for and portions of an image being projected may be adjusted or transformed in a customized manner for enhanced image quality.

Figure 4:
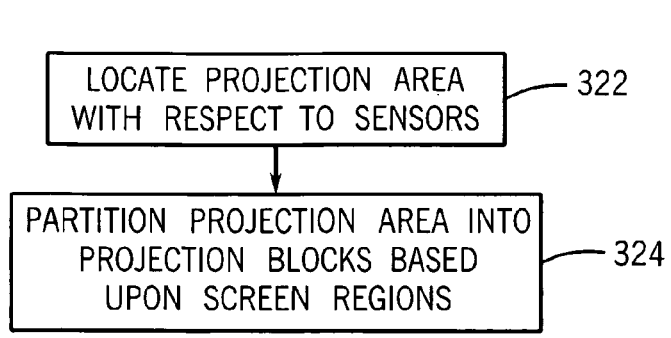
FIG. 4 is a flow diagram of one example of a method for partitioning a projection area into blocks aligned with screen regions according to an example embodiment.

FIG. 4 illustrates one example method 320 for partitioning a projection area 68 (shown in FIG. 1) into blocks 220 that are aligned with screen regions 32. As indicated by step 322, the location of sensors 23 with respect to projection area 68 upon screen 22 is identified. Because information defining the position of sensors 23 with respect to boundaries of regions 32 is available, locating such sensors 23 with respect to projection area 68 facilitates location of projection area 68 with respect to regions 32.

Figure 5A:
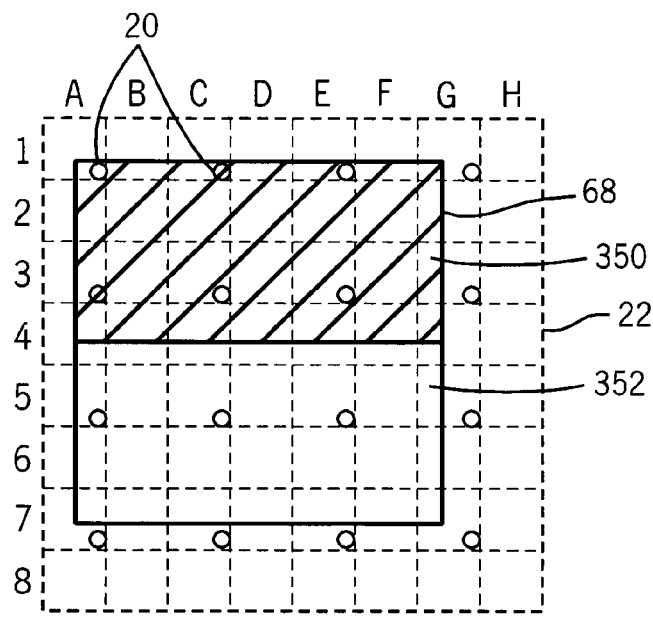
FIGS. 5A-5C are front plan views of a projection area on the screen of the system of FIG. 1, illustrating location of the projection area with respect to sensors of the screen according to an example embodiment.
Figure 5B:
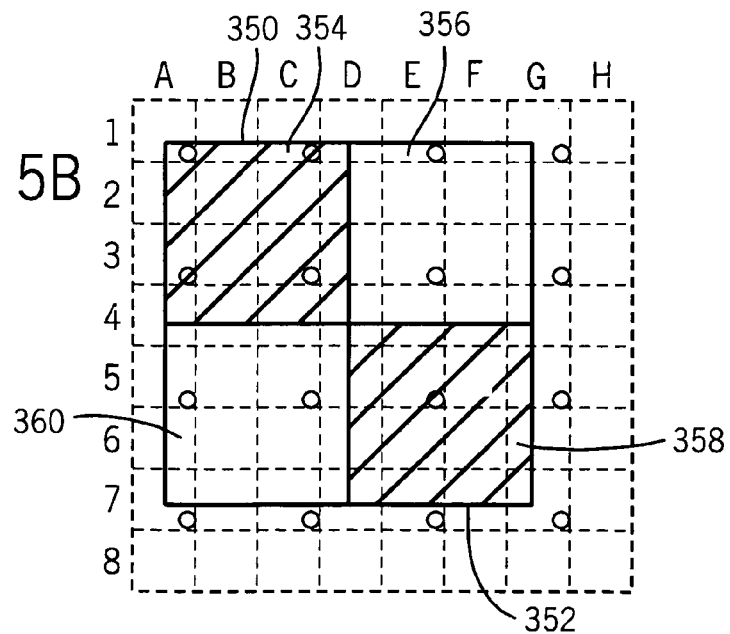
Figure 5C:
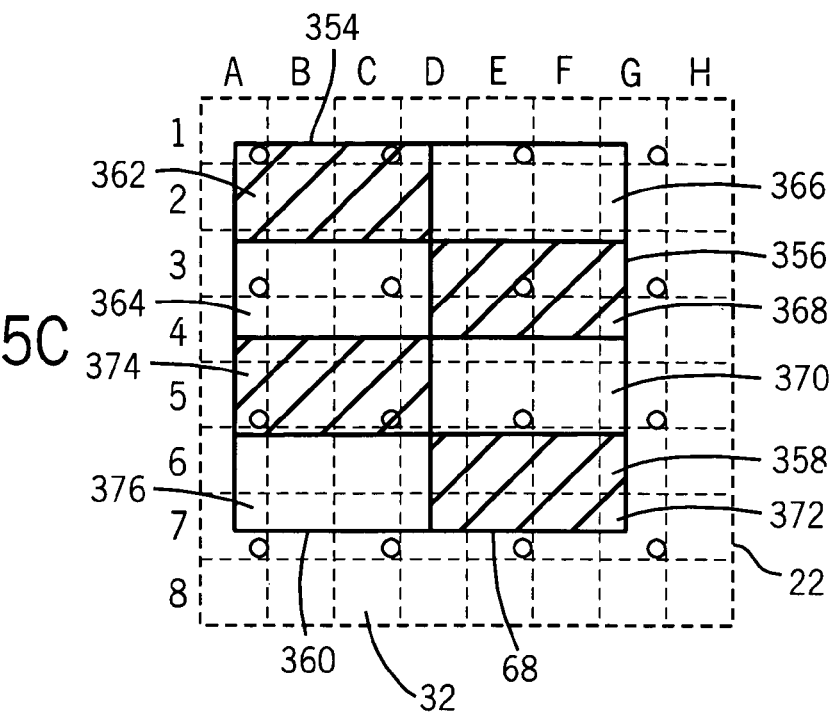

FIGS. 5A-5C illustrate one example method by which locations of sensors 23 may be identified with respect to projection area 68 projected onto screen 22. As shown by FIG. 5A, controller 28, following instructions containing memory 92, generates control signals directing projector 24 to project projection area 68 onto screen 22. Controller 28 generates control signals such that projection area 68 includes a first portion 350 at a first luminance level and a second portion 352 at a second distinct luminance level. In one embodiment, portion 350 may be black while portion 352 is white. As a result, different sensors 23 transmit different signals representing the different levels of intensity of light being sensed across screen 22. For example, sensors 23 outside of projection area 68 will transmit a first signal generally corresponding to an ambient light level from ambient light source 26 (shown on FIG. 1). Sensors 23 within portion 350 will transmit a second distinct signal to controller 28 corresponding to the level of luminance of portion 350. Likewise, sensors 23 being impinged by portion 352 of projection area 68 will transmit a third distinct signal corresponding to the luminance level of portion 352.

As shown by FIG. 5B, controller 28 subsequently generates control signals causing projector 24 to further divide portion 350 into portions 354 and 356 and portion 352 into portions 358 and 360. Controller 28 generates control signals such that portions 354 and 358 have a first luminance level while portions 356 and 360 have a second distinct luminance level. As a result, those sensors 23 located within portion 354 of portion 350 will transmit a distinct signal from those sensors located in portion 356 of portion 350. Likewise, those sensors 23 located in portion 358 of portion 352 transmit a signal distinct from that of sensors 23 located in portion 360 of portion 352.

As shown by FIG. 5C, this process is once again repeated by controller 28 generating control signals directing projector 24 to further divide each of portions 354, 356, 358 and 360 into two portions, such as in half in one embodiment, to divide portion 354 into portions 362 and 364, to divide portion 356 into portions 366, 368, to divide portion 358 into portions 370, 372, and to divide portion 360 into portions 374 and 376. As shown by FIG. 5C, portions 362, 368, 372 and 374 of portions 354, 356, 358 and 360 are provided with a first luminance level while portions 364, 366, 370 and 376 of portions 354, 356, 358 and 360 are provided with a second distinct luminance level. As a result, sensors 23 which previously emitted a common signal as a result of being within region 354 now transmit different signals depending upon whether such sensors are located within portion 362 or 364. Likewise, sensors 23, which previously emitted a common signal as a result of being within portion 356 of projection area 68, now transmit different signals depending upon whether such sensors 23 are within portion 366 or portion 368. The same applies for those sensors located within portions 358 and 360.

This process continues by controller 28 successively dividing portions into two portions, such as in half in one embodiment, and directing project 24 to provide such portions with distinct luminance levels to successively approximate positions of sensors 23 with respect to projected image 68. After a sufficient number of divisions, positions of sensors 23 relative to a relatively small specified portion of projection area 68 may be determined. Because information specifying the position of sensors 23 relative to screen 22 and its regions 32 is available, relative positioning of projection area 68 with respect to regions 32 of screen 22 may also be determined by controller 28.

In lieu of locating projection area 68 with respect to sensors 23 by generating control signals directing projector 24 to project successively smaller checkerboard patterns of different luminance levels upon screen 22, controller 28 may alternatively determine the location of projection area 68 with respect to sensors 23 in other fashions. For example, controller 28 may alternatively generate control signals directing projector 24 to project a sequence of descending vertical and horizontal stripes having different luminance levels to locate X and Y locations of sensors 23 in reference to projection area 68. In lieu of successively projecting smaller and smaller checkerboard patterns upon screen 22, controller 28 may alternatively generate control signals directing projector 24 to project a checkerboard pattern upon screen 22, wherein each portion of the checkerboard pattern has a distinct luminance level (i.e. greater than two luminance levels projected at once upon screen 22). As a result, the number of successive iterations that would otherwise be used to identify the location of projection area 68 with respect sensors 23 may be reduced.

Figure 6:
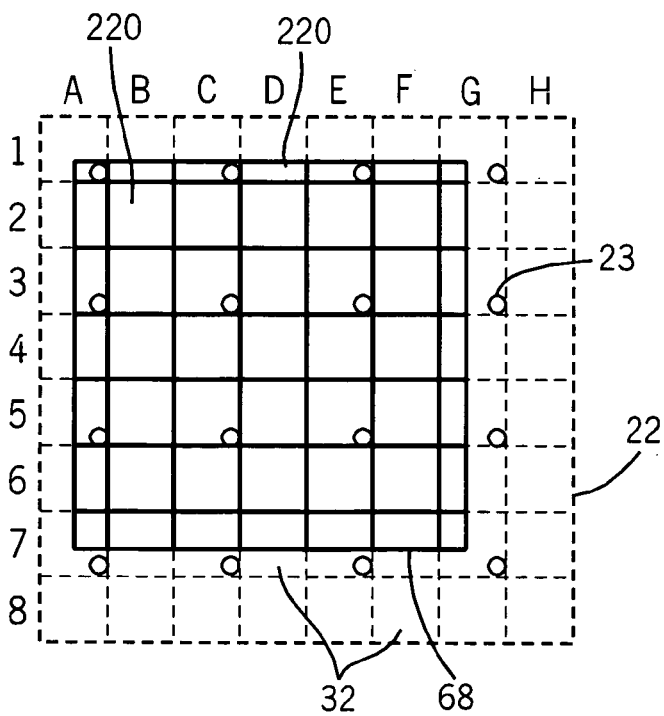
FIG. 6 is a front plan view of the projection area partitioned into blocks aligned with the screen regions according to one example embodiment.

As indicated by step 324 in FIG. 4 and as shown in FIG. 6, once the relative positioning of projection area 68 with respect to region 32 has been determined, controller 28 partitions projection area 68 into projection blocks 220 based upon screen regions 32. In particular, controller 28 partitions projection area 68 into blocks 220 having boundaries common with an underlying boundaries of regions 32. The determined boundaries of blocker 220 are stored for subsequent use in memory 92 (shown in FIG. 1). As shown in FIG. 6, outermost portions of projection area 68 may be partitioned into blocks 220 which are smaller than corresponding regions 32 of screen 22 but which have common inner boundaries. By partitioning projection area into blocks 220 and aligning such blocks 220 with corresponding regions 32, image processing may be independently performed on each image block based upon distinct reflectivities associated with corresponding screen regions 32.

Figure 7:
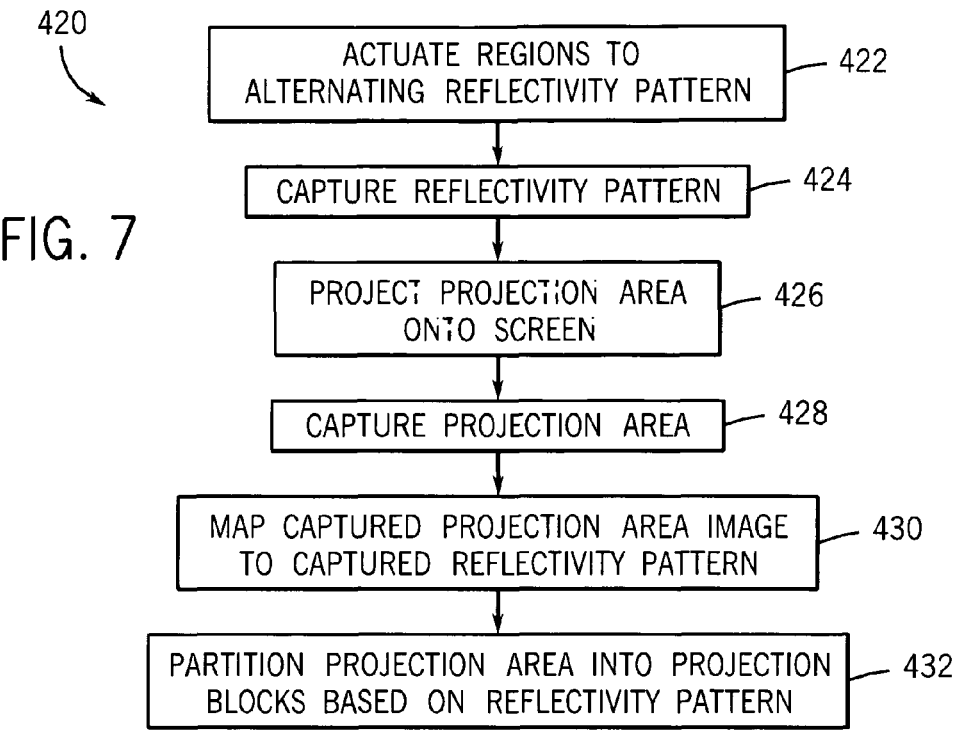
FIG. 7 is a flow diagram of one example of a method for petitioning a projection area into blocks aligned with the screen regions according to an example embodiment.
Figure 8:
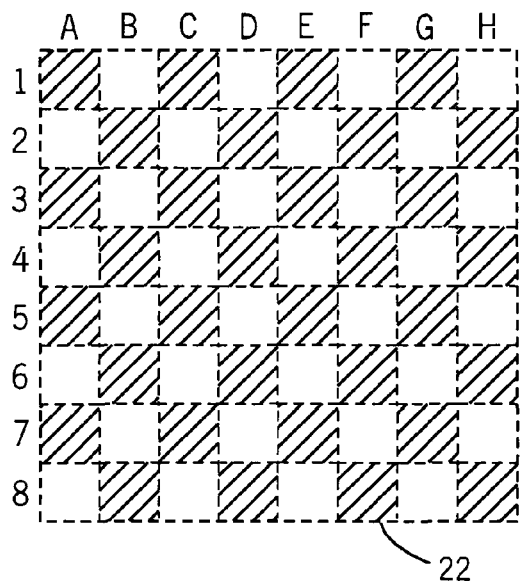
FIG. 8 is a front plan view of a screen having regions having an alternating reflectivity pattern according to one example embodiment.
Figure 9:
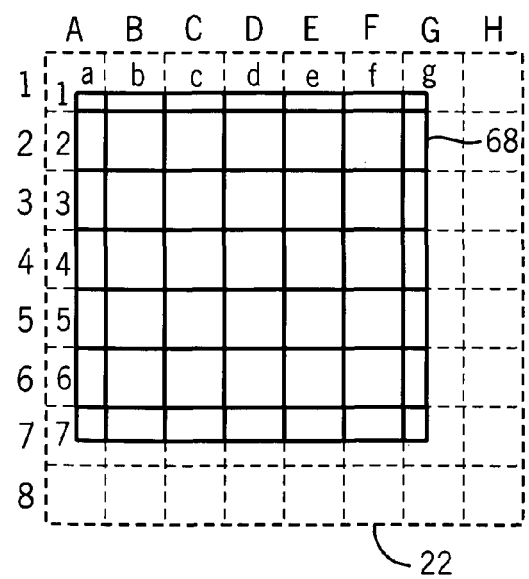
FIG. 9 is a front plan view of a projection area partitioned in to blocks aligned with the screen regions of FIG. 8 according to one example embodiment.

FIGS. 7-9 illustrate yet another example method 420 for partitioning projection area 68 into image blocks 220 that are aligned with screen regions 32. As shown by FIG. 1, projection system 20 may include sensor 230 (shown in phantom). Sensor 230 constitutes a device configured to capture images or patterns reflected from screen 22 and to communicate such images to controller 28. In one embodiment, sensor 230 may constitute a camera configured to communicate with sensor 28 through external interface 232 of controller 28. In such an embodiment in which sensor 230 is utilized to facilitate partitioning of projection area 68 into image blocks 220 aligned with screen regions 32, sensors 23 may be omitted or may be replaced with other sensors used to measure ambient light per step 124 and ambient light plus projector light per step 126 as will be described hereafter.

As indicated by step 422 in FIG. 7, controller 28 (shown on FIG. 1) following instructions contained in memory 92, generates control signals directing screen 22 to actuate regions 32 to an alternating reflectivity pattern such as shown in FIG. 8. For example, in one embodiment, half of regions 32 are set to a lowest achievable reflectivity for the embodiment of screen 22 used while the remaining half of regions 32 are set to a greatest achievable reflectivity for the embodiment of screen 22 used.

As indicated by step 424 in FIG. 7, controller 28 generates control signals directing sensor 230 to capture the reflectivity pattern of regions 32 of screen 22. In one embodiment, sensor 32 may capture ambient light from ambient light source 26 which has been reflected off of each of regions 32. In another embodiment, sensor 32 may capture both ambient light and light from projector 24 which has been reflected off of each of regions 32. Sensor 230 transmits the captured reflectivity pattern to controller 28, wherein the reflectivity pattern is stored in memory 92.

As indicated by step 426 in FIG. 7, controller 28, following instructions contained in memory 92, generates control signals directing projector 24 to project projection area 68 upon screen 22 as shown in FIG. 9. As indicated by step 428, controller 28 further generates control signals directing sensor 230 to sense and capture projection area 68 upon screen 22. The image of projection area 68 upon screen 22 is transmitted to controller 28 where it is stored in memory 92 (shown in FIG. 1).

As indicated by step 430 in FIG. 7, using the captured reflectivity pattern obtained in step 424 and the captured projection area 68 obtained in step 428, controller 28, following instructions contained in memory 92, maps the captured projection area image to the captured reflectivity pattern. In doing so, the physical relationship of projection area 68 relative to regions 32 of screen 22 is determined.

As indicated by step 432 in FIG. 7 and shown in FIG. 9, controller 28 uses the relative positioning of projection area 68 to the captured reflectivity pattern which indicates the boundaries of regions 32, controller 28 may partition projection area 68 into projection blocks 220 based upon the reflectivity pattern of regions 32. As with method 320 illustrated in FIGS. 4-6, method 420 enables projection area 68 to be divided into blocks 220 that are sized and aligned with regions 32 of screen 22.

As shown by FIG. 9, outermost portions of projection area 68 may be smaller than their corresponding regions 32 of screen 22, but have similar interior boundaries. Once again, because projection system 20 partitions projection area 68 into projection blocks 220 that are sized and shaped so as to correspond to independently actuatable regions 32 of screen 22, portions of an image contained within projection blocks 220 of projection area 68 may be adjusted, transformed or otherwise modified independent of other portions of the image contained in other projection blocks based upon the selected reflectivities for their associated regions 32. In other words, regions 32 of screen 22 may be set to distinct reflectivities and image pixels contained within corresponding projection blocks may also be modified independent of one another based upon the particular reflectivities chosen for an associated region 32 of screen 22.

As indicated by step 124 in FIG. 3, ambient light from ambient light source 26 is measured. Based upon the sensed or input ambient light value, projection system 20 adjusts the operation of projector 24 and screen 22 to compensate for the ambient light value. In one embodiment, processor 90, following instructions contained in memory 92, generates control signals directing sensors 23 to sense ambient light levels proximate to different regions 32 of screen 22. In other embodiments, sensors 23 may be configured to continuously sense and transmit signals representing ambient light levels to processor 90. In still other embodiments, ambient light may be sensed or measured using other sensing devices other than sensors 23. In still other embodiments, in lieu of sensing ambient light, ambient light values may be input or otherwise provided to projection system 20 by an operator or user of projection system 20 through input 86 or from an external device in communication with controller 28. In one embodiment, ambient light values that are used by controller 28 to direct the operation of projector 24 and screen 22 may be manually input by rotating in input knob or actuating some other manual input mechanism. For example, by turning a knob or other mechanical input device, an operator may input an estimate of the amount of ambient light intensity until he or she sees the best possible image quality on screen 22.

In one embodiment, ambient light is sensed by controller 28 generating control signals such that projector 24 is off or is otherwise projecting a black image. At the same time, controller 28 generates control signals setting each of regions 32 of screen 22 to a fixed reflectivity setting, for example, a greatest achievable reflectivity for screen 22. By receiving input from multiple sensors 23, controller 28 may determine non-uniformity of ambient light across regions 32.

As indicated by step 126, projection system 20 measures or senses ambient light plus projected light. In one embodiment, controller 28 generates control signals setting the reflectivity of all screen regions 32 to a common fixed reflectivity setting, for example, a greatest achievable reflectivity for screen 22 and further generates control signals directing projector 24 to project a selected luminance level of white light upon screen 22. Sensors 23 transmit signals representing the ambient light plus the projected light to controller 28. As a result, controller 28 may quantify the level of ambient light in terms of the intensity of light projected by projector 24. For example, controller 28 may generate control signals directing projector 24 to project white light at its highest luminance level towards screen 22. As a result, sensors 23 sense a greatest luminance that may be provided to an image pixel reflected off of screen 22. Based upon the sensed or input ambient light value obtained in step 124 and its quantification relative to light projected from projector 24, and a selected reflectivity of one or more regions 32 of screen 22, projection system 20 compensates for the ambient light to enhance image contrast.

As indicated by step 128 in FIG. 3, controller 28 receives image data or video input 84 (shown in FIG. 1). Upon receiving such video input, as indicated by step 130 in FIG. 3, controller 28 selects different reflectivities for different screen regions 32 based upon ambient light values sensed or assigned to different screen regions 32 and based upon the received image data. According to one embodiment, the reflectivity R of each screen region 32 is selected according to the following:

$R = T/(T+A)$, where:

R is reflectivity of the screen;
T is average target luminance of image pixels of the particular projection block 220; and
A is the ambient light value of the corresponding screen region 32.

In other embodiments, reflectivities for individual screen regions 32 may be selected by controller 28 in other manners, such as the mode, median, maximum or some other statistic of the luminance values of the pixels 220 that are displayed on that screen region. In yet another embodiment, the reflectivity R of a particular screen region 32 may be chosen so as to increase or reduce the number of pixels of the image in the corresponding projection block having target luminances T that fall within one or more ranges or regimes, wherein target luminances T of image pixels are differently transformed based upon the regions or regimes in which such pixels lie, as will be described in greater detail hereafter. In still other embodiments, different reflectivities R for different screen regions 32 may be selected or chosen manually by a user of projection system 20 inputting desired reflectivity values for distinct regions 32 through input 86 (shown in FIG. 1).

As indicated by step 132 in FIG. 3, controller 28 adjusts, modifies or otherwise transforms target luminances T of image pixels to projection luminances P in each projection block 220. In particular, controller 28 transforms the target luminances of pixels to projection luminances based upon the selected reflectivity for the associated screen region, and the sensed or input ambient light value for the screen region 32 to closely match the luminances of pixels in the projection with ambient light to viewed luminances of the pixels when viewed with a lambertian screen with no ambient light.

Figure 10:
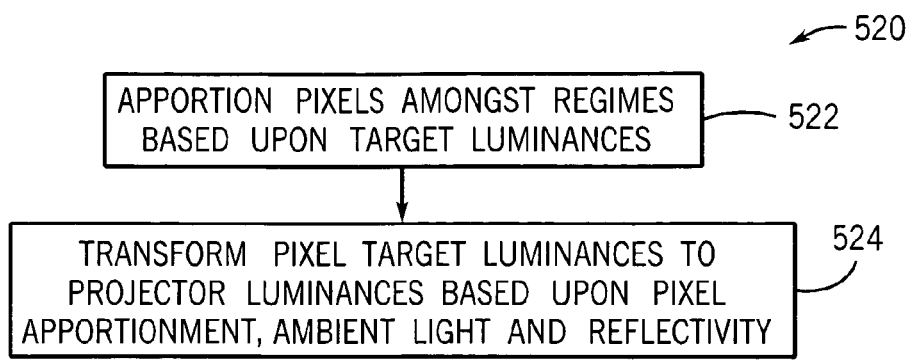
FIG. 10 is a flow diagram of one example of a method for transforming luminances of pixels according to one example embodiment.

FIG. 10 is a flow diagram illustrating one example method 520 by which controller 28 (shown in FIG. 1) may transform target luminances T of image pixels to projection luminances P in each projection block 220. As indicated by step 522 in FIG. 10, controller 28, following instructions contained in memory 92, analyzes and compares the target luminance T of each image pixel in a projection block so as to apportion such pixels amongst multiple groupings or regimes based upon their target luminances T. In one embodiment, the pixels are apportioned amongst regimes based upon their target luminances T, the selected reflectivity R of the associated screen region 32 and the ambient light value A associated with the screen region 32.

As indicated by step 524 in FIG. 10, upon determining in which regime an individual pixel of an image block may belong, controller 28 applies an algorithm or formula to adjust, modify or otherwise transform the target luminance T of the individual pixel to a projector luminance P based upon the regime in which the pixel belongs (pixel apportionment), the ambient light value A for the associated screen region 32 and the reflectivity R for the associated screen region 32.

The transformation of the target luminance T to projector luminance P for each pixel is also based upon a range of luminance levels that may be provided by projector 24. In this manner, the available luminance levels of projector 24 are apportioned amongst the target luminances T of the different pixels of the projection block. Because available luminance levels of projector 24 are apportioned amongst pixels based upon their target luminances, the ambient light value associated with screen region 32 and the reflectivity R associated with screen region 32, contrast between pixels having different target luminances T in a projection block in the presence of ambient light may be closely matched to contrast between target luminances T of individual pixels of a projection block had there been no ambient light and had such pixels been reflected off a lambertian screen. Thus, projection system 20 (shown in FIG. 1) operated according to the example method 520 in FIG. 10, facilitates viewing of images in the presence of ambient light, such as in a lighted room, while achieving image contrast close to or matching that of an image viewed in a completely dark or near dark environment, such as in a movie theater.

Figure 11A:
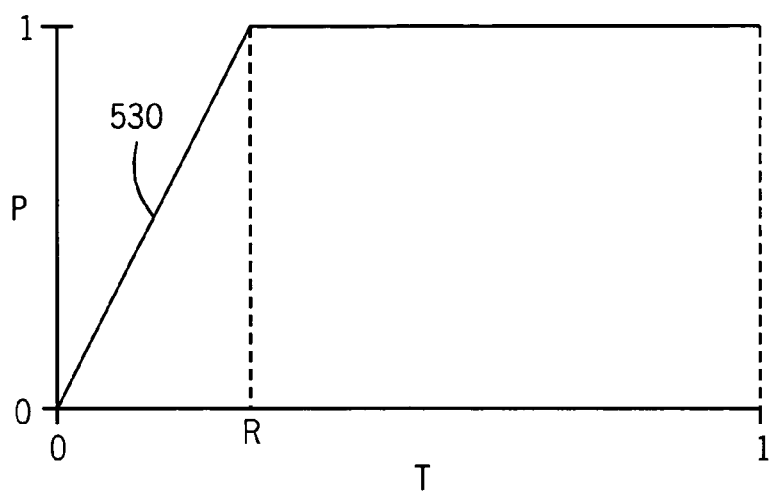
FIG. 11A is a graph illustrating one example of a transform for transforming pixel target luminances to projection luminances according to one example embodiment.
Figure 11B:
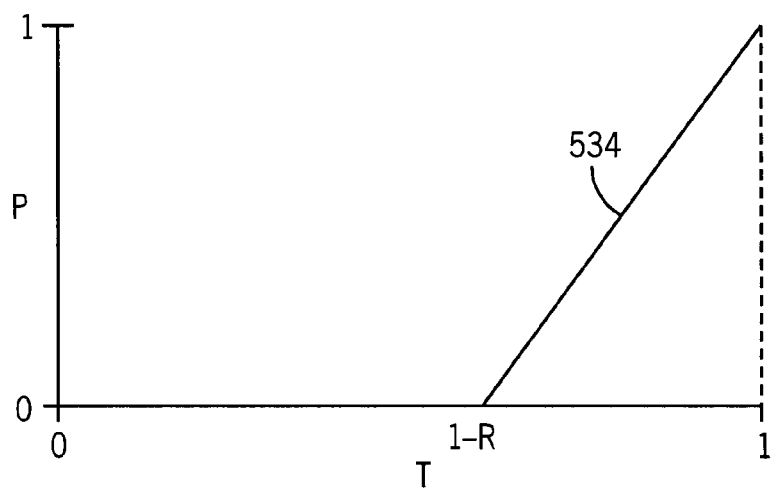
FIG. 11B is a graph illustrating another example of a transform for transforming pixel target luminances to projection luminances according to example embodiment.
Figure 11C:
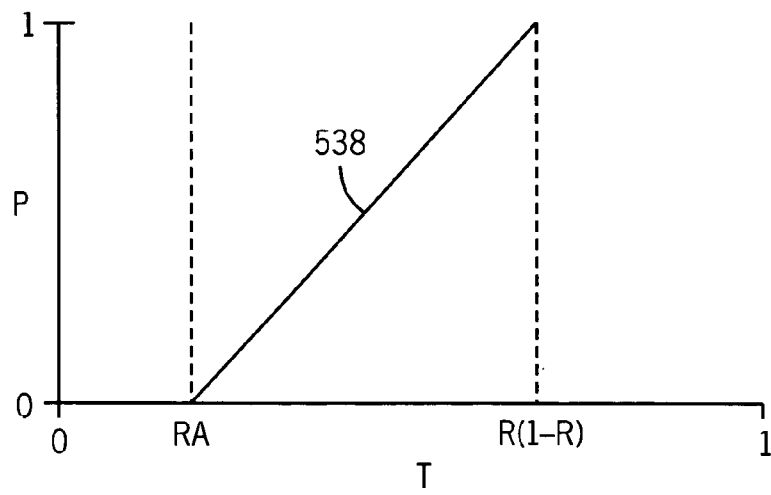
FIG. 11C is graph of another example of a transform for transforming pixel target luminances to projection luminances according to an example embodiment.

FIGS. 11A-11C illustrate one example of apportioning pixels amongst regimes based upon their target luminances T and transforming such target luminances T to projector luminances P based upon what particular regime the target luminances T of a pixel may lie, a reflectivity R of the associated screen region 32, the available luminance levels or range provided by projector 24 and the ambient light value A of the associated screen region 32. As shown in each of FIGS. 11A-11C, target luminances T are scaled or otherwise set so as to range from a 0 (black) value to a 1 (white) value. The target luminance T is the amount of light reflected from a given pixel in an image from a lambertian screen in a dark room.

In each of FIGS. 11A-11C, the projection luminance P represents the amount of light projected by projector 24 for a given pixel and is scaled or otherwise set to range from a 0 (black) value to a 1 (white) value. The 1 (white) value represents the greatest amount of luminance that may be projected by the embodiment of projector 24 used for the particular image block by projection block 220. For example, a projection luminance P of 0.5 would generally mean that projector 24 is projecting light for a given pixel with a luminance level of 50% of the greatest luminance that may be provided by projector 24 at the particular pixel. The greatest available projection luminance that may be provided by projector for a particular projection block that is used to transform the target luminances to projection luminances may be the value provided by the manufacturer of projector 24 or may be some other value established by the user for projection system 220 of projection system 20.

For purposes of the method and algorithm illustrated with respect to FIGS. 11A-11C, the reflectivity R of a particular screen region 32 is a value relative to a lambertian screen, wherein a 0 value is black and wherein a 1 value is that of a lambertian screen. The ambient light A associated with the particular screen region 32 is the amount of light, relative to projector white, not coming from the projected image. For purposes of the method described with respect to FIGS. 11A-11C, the ambient light value A is scaled or otherwise set so as to range from a 0 value representing no ambient light (i.e., a dark room) to a greatest value of 1 which has the same luminance or amount of light as that of the greatest available luminance that may be projected by projector 24 (P equals 1).

According to one embodiment, the scaling of the ambient light value A relative to available luminance levels of projector 24 is performed in steps 124 and 126 of method 120 shown in FIG. 3. In particular, the greatest projection luminance provided by the embodiment of projector 24 used is determined by subtracting the measured ambient light obtained in step 124 from the value obtained in step 126 representing both ambient light plus projected light. This greatest projected luminance of projector 24 is scaled to 1. The same conversion rate applied to light projected by projector 24 to scale the greatest projection light to a value of 1 is then applied to the ambient light value. For example, if an ambient light value of 40 was sensed in step 124 and a value of 240 was sensed for ambient light plus projected light, controller 28 (shown in FIG. 1) would subtract the ambient light value A from the combined ambient and projected light value to 40 to determine if the greatest projected luminance level of projector 24 is 200. To scale the 200 value to a value of 1, the greatest projection luminance level of 200 of controller 28 would multiply the greatest projection luminance level of 200 by 0.005. Likewise, the ambient light value of 40 would also be multiplied by 0.005 such that the ambient light value used to apportion the pixels of a projection block amongst different regimes or classifications, potentially used to transform such target luminances to projection luminances and potentially used to select a reflectivity R for a particular screen region 32 would be 0.2 (40 multiplied by 0.005). In other methods, such scaling of the ambient light value A to available projection luminance levels of projector 24 may be omitted.

As shown by FIGS. 11A-11C, target luminances T of pixels in a particular projection block 220 are apportioned amongst three classifications or regimes operating under the presumption that the darkest that a region 32 of screen 22 may get is when the projector 24 is turned off. In such a scenario, region 32 of screen 22 is illuminated by ambient light and not projector light and reflects such ambient light, without reflecting projector light, such that the display or observed luminance or brightness P is R×A. Further operating under the presumption that the brightest the screen can get is when the projector is fully on (P=1), the display or reflected luminance is R×(1+A). Based on such presumptions, for a given screen reflectivity R, three luminance regimes are used:

(1) those pixels having target luminance values T which should be darker than the screen in the presence of ambient light can obtain (T<R×A);

(2) those pixels whose target luminances T can be matched by some luminance level P of projector 24 and screen 22 in the presence of ambient light (T=R×(P+A)); and (3) those pixels having target luminances which are brighter than screen 22 and projector 24 in the presence of ambient light can obtain (T>R×(1+A)).

FIG. 11A illustrates one example scenario in which each of the pixels in a projection block 220 have a target luminance T which is darker than ambient light A that is reflected from region 32 of screen 22 having a reflectivity R, (T<R×A). In the scenario illustrated in FIG. 11A, the transform 530 is applied to the target luminances T to convert or transform such target luminances T to appropriate projection luminances P. Transform 530 ramps the luminance levels of projector 24 to account for the reflectivity R of the particular screen region 32. In the particular example illustrated, transform 530 is formulated as:

$$P_{ij}=T_{ij}/R, \text{ where:}$$

$P_{ij}$=a projection luminance for an image pixel have coordinates i, j;

$T_{ij}$=target luminance of image pixel having coordinates i, j; and

R=reflectivity of the screen.

In other embodiments, transform 530 may comprise another formulation.

FIG. 11B illustrates an example scenario in which the target luminances T of each of the pixels of a projection block 220 are brighter than what can be attained by the reflectivity R of the particular region 32 of screen 22 and the light projected by projector 24 in the presence of ambient light provided by light source 26 (T>R×(1+A)). In such a scenario, the target luminances of each of the pixels is converted or transformed to a projection luminance using transform 534. Transform 534 boosts the range of target luminances T accounting for reflectivity. In one embodiment, transform 534 may be formulated as follows:

$$P_{ij}=1-1/R+T_{ij}/R, \text{ where:}$$

$P_{ij}$=a projection luminance for an image pixel have coordinates i, j,

R=reflectivity of the screen; and $T_{ij}$=target luminance of image pixel having coordinates i, j.

In yet other embodiments, transform 534 may have other formulations.

FIG. 11C illustrates an example scenario in which each of the pixels of a projection block 220 have target luminances T that can be matched by the light projected from projector 24, the reflectivity R of screen region 32 and the ambient light A reflected from screen region 32 (T=R×(P+A)). In such a scenario, controller 28 (shown in FIG. 1) transforms the target luminances T of each of pixels to projection luminances P using transform 538. Transform 538 apportions available projection luminance levels of projector 24 amongst the different pixels based upon the target luminances of such pixels. In one embodiment, transform 538 is formulated as follows:

$$P_{ij}=T_{ij}/R-A, \text{ where:}$$

$P_{ij}$=a projection luminance for an image pixel have coordinates i, j, $T_{ij}$=target luminance of an image pixel having coordinates i, j;

R=reflectivity of the screen; and

A=light value.

In other embodiments, transform 538 may have other formulations.

Figure 12:
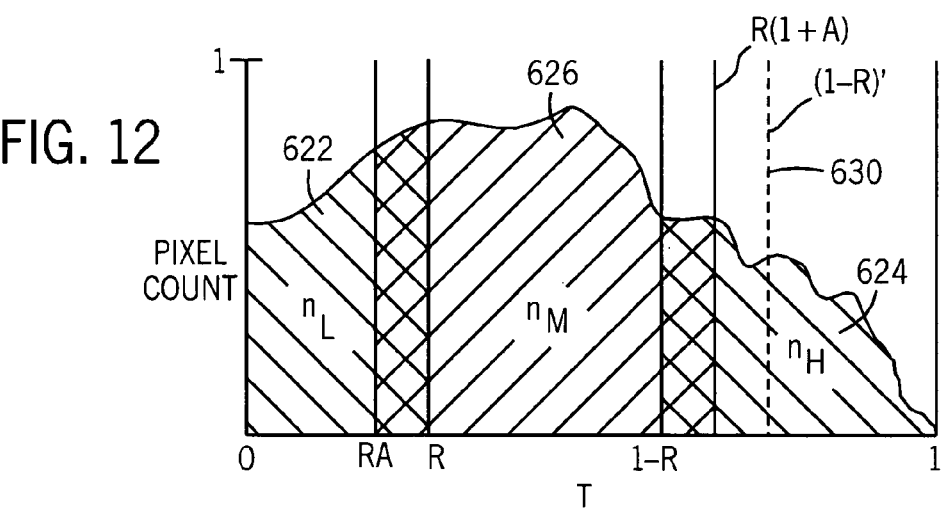
FIG. 12 is histogram illustrating distribution of pixel target luminances of an image according to one example embodiment.
Figure 13:
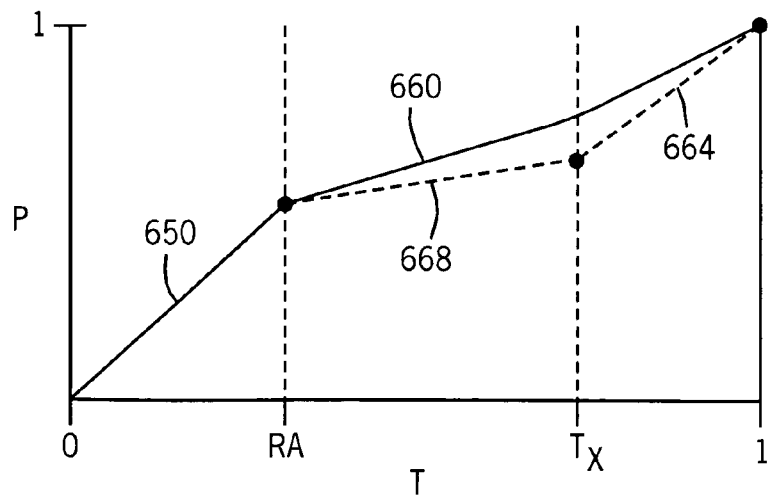
FIG. 13 is graph illustrating examples of transforms for transforming pixel target luminances to projection luminances according to an example embodiment.

FIGS. 12 and 13 illustrate one example process by which the target luminances of pixels in a projection block 220 are transformed to projection luminances in a scenario wherein the target luminances of the pixels in the particular projection block 220 are distributed amongst multiple regimes. In particular, FIGS. 12 and 13 illustrate one example method of transforming target luminances to projection luminances where the target luminances of pixels are distributed in each of the regimes described above with respect to FIGS. 11A, 11B and 11C. Because the target luminances of the pixels distributed or otherwise fall into these different regions or regimes, the transforms 530, 534 and 538 described with respect to FIGS. 11A, 11B and 11C, are combined. In one embodiment, the different transforms 530, 534 and 538 are combined based upon the distribution of the pixels amongst the regimes. In one embodiment, this is done by counting to determine the proportion of pixels in each of the regimes. Based upon the determined proportion of pixels in each regime, the slope of each transform 530, 534 and 538 is scaled by the proportion of pixels in the associated regime. Subsequently, the scaled transforms are stacked together.

FIG. 12 is a histogram illustrating one example distribution of pixels in a particular projection block 220 (shown in FIG. 1) having target luminances T in each of regimes 622, 624 and 626. Similar to the particular regime illustrated in FIG. 11A, regime 622 in FIG. 12 includes pixels having target luminances ranging from a zero luminance to a luminance value corresponding to the reflectivity R of the associated screen region 32 (shown in FIG. 1). Similar to the regime depicted in FIG. 11B, regime 624 in FIG. 12 includes those pixels having target luminances ranging from a luminance value of 1 down to a luminance value of 1 minus the reflectivity R of the associated screen region 32. Similar to the regime depicted in FIG. 11C, regime 626 of FIG. 12 includes those pixels having target luminances T ranging from a luminance value equal to the reflectivity R of the associated screen region 32 multiplied by the ambient light value A for the screen region up to a luminance value equal to a reflectivity R of the associated screen region 32 multiplied by the sum of 1 plus the ambient light value A for the associated screen region 32. As shown by FIG. 12, in some cases, regimes 622, 624 and 626 may overlap. As indicated by alternative lower boundary line 630 which corresponds to a luminance value (1−R)', in some embodiments, the values for R and A may be such that a gap exists between the alternative lower boundary 630 of regime 624 and the upper boundary of regime 626.

In one embodiment, the number of pixels within each regime are counted. Due to the overlapping of the boundaries of such regimes, some pixels in overlapping regions are counted twice, once for both of the overlapping regimes. In other embodiments, the upper and lower boundaries of regime 626 may be used to also define the upper boundary of region 622 and the lower boundary of regime 624, respectively. However, using the lower and upper boundaries of regimes 626 as the upper and lower boundaries of regime 622 and 624, respectively, has been found to over-emphasize light portions of an image to the detriment of darker portions. In scenarios where a gap exists between the lower boundary of regime 624 and the upper boundary of regime 626, those pixels contained in the gap are not counted for the purpose of scaling transforms 530, 534 and 538. In other embodiments, such pixels contained in such gaps may be apportioned to regime 624 and/or regime 626.

FIG. 13 illustrates the combining or stacking of transforms 530, 534 and 538 (shown and described with respect to FIGS. 11A, 11B and 11C) as scaled based upon a distribution of target luminances amongst the different regimes. As shown by FIG. 13, transform 650 is applied to those pixels having a target luminance T less than the lower boundary of regime 626 (shown in FIG. 13) which is the reflectivity R of the particular screen region 32 multiplied by the ambient light level A associated with the particular screen region 32. Because transform 650 is applied to pixels having target luminances less than the lower bound of regions 626 rather than the upper bound of regime 622, a greater number of pixels may be assigned projection luminances P that are more closely matched to the target luminances given the presence of ambient light in a non-lambertion screen. Transform 650 is similar to transform 530 (shown in FIG. 11A) except that transform 650 is scaled based upon the proportion of pixels amongst the various regimes. In one embodiment, transform 650 is formulated as follows:

$$P_{ij}=N_L T_{ij}/R \text{ for } \emptyset \leq T_{ij} \leq RA, \text{ where:}$$

$N_L=F(n_L/n_{TOT})$, $n_L$=number of pixels whose target luminances $T_{ij}$ are less than the reflectivity of the screen region 32, $n_{TOT}$=total number of image pixels, R=reflectivity of the screen region 32; and $T_{ij}$=target luminance of image pixel having coordinates i, j.

As noted above, $N_L$ is equal to a function F of $n_L/n_{TOT}$. In one embodiment, the function F is a power of the percentage of total pixels within regime 622. As a result, a particular weighting may be given to the percentage of pixels within region 622 for image quality. In the particular example illustrated, $N_L$ equals $(n_L/n_{TOT})^{0.75}$. In other embodiments, other powers and other weightings may be given to the percentage of pixels having target luminances within the regime 622. In still other embodiments, transform 650 may have other formulations.

As further shown by FIG. 13, pixels having target luminances T greater than the reflectivity R of the particular region 32 multiplied by the ambient light A associated with the particular screen region 32 are transformed to projection luminances P using transform 660. In the particular embodiment illustrated, transform 660 constitutes a combination of transforms 534 and 538 (shown and described with respect to FIGS. 11B and 11C) after such transforms have been sloped based upon the distribution of pixel target luminances T. In one embodiment, transform 660 constitutes a cubic spline of scaled transforms 534 and 538. In one embodiment, transform 660 may be formulated as follows:

$$P_{ij}(Tij)=aT_{ij}^3+bT_{ij}^2+cT_{ij}+d \text{ for } RA \leq T_{ij} \leq 1, \text{ where}$$

$P(RA)=N_L A$
$P'(RA)=N_M/R$,
$P(1)=1$,
$P'(1)=N_H/R$,
$N_L=F(n_L/n_{TOT})$, $n_L$=number of pixels whose target luminances $T_{ij}$ are less than the reflectivity of the screen, $N_M=F(n_M/n_{TOT})$, $n_M$=number of pixels whose target luminances $T_{ij}$ are greater than RA and less than R(1+A), $N_H=F(n_H/n_{TOT})$, $n_H$=number of pixels whose target luminances $T_{ij}$ are greater than 1−R, $n_{TOT}$=total number of pixels, R=reflectivity of the screen, $T_{ij}$=target luminance of a pixel having coordinates i, j, and A=a light value.

This results in a system of four equations and four unknowns that may be easily solved to compute the transform.

As noted above, in one embodiment, $N_M$ is a function F of $n_M/n_{TOT}$. In one embodiment, the function F is a power of $n_M/n_{TOT}$ so as to appropriately weight the percentage of pixels having target luminance T within regime 626. In one embodiment, transform 660 utilizes a value for $N_M$ equal to $(n_M/n_{TOT})^{0.667}$. As noted above, transform 660 also utilizes a value for $N_H$ equal to a function F of $(n_H/n_{TOT})$. In one embodiment, the function F is a power of $n_H/n_{TOT}$ so as to appropriately weight the percentage of pixels having target luminances T within regime 624. In one embodiment, transform 660 has a value for $N_H$ equal to $(n_H/n_{TOT})^{1/2}$. It has been found that such weighting provides enhanced image quality. In other embodiments, transform 660 may utilize other powers or other functions of the percentages of pixels having target luminances in regime 626 or 624.

In some embodiments where transforms 534, and 538 (shown and described with respect to FIGS. 11B and 11C), as scaled and combined, intersect one another at point $T_X$, distinct transforms 664 and 668 (shown in broken lines) may alternatively be applied to transform target luminance values T of pixels to projection luminance values P. For example, in one embodiment, transforms 534 and 538 (shown in FIGS. 11B and 11C) may intersect at point $T_X$ which may be defined as follows:

$$T_x=R(1+(N_M-N_L)A-N_H)/(N_M-N_H), \text{ where:}$$

$N_L=F(n_L/n_{TOT})$, $n_L$=number of pixels whose target luminances $T_{ij}$ are less than the reflectivity of the screen, $N_M=F(n_M/n_{TOT})$, $n_M$=number of pixels whose target luminances $T_{ij}$ are greater than RA and less than R(1+A), $N_H=F(n_H/n_{TOT})$, $n_H$=number of pixels whose target luminances $T_{ij}$ are greater than 1−R, $n_{TOT}$=total number of pixels, R=reflectivity of the screen, $T_{ij}$=target luminance of a pixel having coordinates i, j, and A=a light value.

In such a scenario, pixels having target luminances T greater than the reflectivity R of the associated region 32 multiplied by the ambient light value A associated with the particular screen region 32 but less the value $T_X$ are transformed to projection luminances P according to transform 668 which may be formulated as follows:

$$P_{ij}=N_L A+((N_H/R)(T_X-1)+1-N_L A)(T_{ij}-AR)/(T_X-AR)$$
for $RA \leq T_{ij} \leq T_X$, where:

$N_L = F(n_L/n_{TOT})$,
$n_L$=number of pixels whose target luminances $T_{ij}$ are less than the reflectivity of the screen,
$N_M = F(n_M/n_{TOT})$,
$n_M$=number of pixels whose target luminances $T_{ij}$ are greater than RA and less than R(1+A),
$N_H = F(n_H/n_{TOT})$,
$n_H$=number of pixels whose target luminances $T_{ij}$ are greater than 1−R,
$n_{TOT}$=total number of pixels,
R=reflectivity of the screen,
$T_{ij}$=target luminance of a pixel having coordinates i, j,
A=a light value, and
$T_x=R(1+(N_M-N_L)A-N_H)/(N_M-N_H)$.

For those pixels having target luminances T greater than $T_X$, the target luminances T of such pixels are transformed to projection luminances P using transform 664 which may be formulated as follows:

$$P_{ij}=1-N_H/R+N_H T_{ij}/R \text{ for } T_X \leq T_{ij} \leq 1, \text{ where}$$

$N_L = F(n_L/n_{TOT})$,
$n_L$=number of pixels whose target luminances $T_{ij}$ are less than the reflectivity of the screen,
$N_M = F(n_M/n_{TOT})$,
$n_M$=number of pixels whose target luminances $T_{ij}$ are greater than RA and less than R(1+A),
$N_H = F(n_H/n_{TOT})$,
$n_H$=number of pixels whose target luminances $T_{ij}$ are greater than 1−R,
$n_{TOT}$=total number of pixels,
R=reflectivity of the screen,
$T_{ij}$=target luminance of a pixel having coordinates i, j,
A=a light value, and
$T_x=R(1+(N_M-N_L)A-N_H)/(N_M-N_H)$.

As noted above, both transforms 664 and 668 utilize functions F of $n_M/n_{TOT}$ and $n_H/n_{TOT}$. In one embodiment, the functions applied constitute powers to appropriately weight the percentage of pixels in regimes 624 and 626. In one embodiment, transforms 664 and 668 utilize values wherein $n_M$ is equal to $(n_M/n_{TOT})^{0.667}$ and wherein $N_H$ is equal to $(n_H/n_{TOT})^{1/2}$ to appropriately weight pixels for enhanced image quality. In other embodiments, the function F applied to the percentage of pixels within regime 624 and 626 may constitute other functions, other powers or may be omitted.

By apportioning pixels among regimes based upon their target luminances T and by transforming such pixel target luminances T to projector luminances P based upon such pixel apportionment, ambient light A and reflectivity R associated with a particular screen region 32, method 520 (shown in FIG. 10) may closely match actual viewed luminances of such pixels in the projection in the presence of ambient light to near ideal conditions where viewed luminances of pixels are viewed with a lambertion screen and no ambient light.

In other embodiments, method 520 may transform pixel target luminances T to projector luminances P using other transforms as well as using other factors in addition to or besides pixel apportionment, ambient light and reflectivity. Moreover, in lieu of closely matching viewed luminances of pixels in a projection with ambient to viewed luminances of pixels when viewed with a lambertion screen and no ambient light, method 520 may alternatively utilize one or more transforms for closely matching perceived brightnesses of pixels in a projection with ambient light to viewed perceived brightnesses of pixels when viewed with a lambertion screen without ambient light. Perceived brightness of an image may be defined as a logarithmic function of a luminance value for the same pixel. In another embodiment, wherein the perceived brightness of pixels in a projection with ambient are to be closely matched to viewed perceived brightness of pixels when viewed with a lambertion screen without ambient light, the same transforms 530, 534, 538 or 650, 660, 664 and 668 may be utilized by transforming target luminances T to projection luminances P using an logarithmic value of the target luminance T of each pixel rather than the target luminance T itself of each pixel. For example, instead of using target luminance T, a transform may alternatively use a logarithmic function of target luminance T to calculate a perceived brightness of the projector luminance P. Once this is calculated, the inverse of the logarithmic function is applied to the result of the transform to once again arrive at the projector luminance P, and control signals are generated directing a projector to provide the particular pixel with the projector luminance P. In other embodiments, other transforms using power functions of target luminances T to calculate projection luminances P may be utilized.

As indicated by step 134 in FIG. 3, different levels of screen brightness across screen 22 are blended. Display brightness, also referred to as display luminance, is the observed brightness of the given image pixel after it has been reflected from screen 22. Display brightness is generally equal to the reflectivity R multiplied by the sum of the projection luminance of the pixel and ambient light. Display luminance may range from a zero value in which no light is reflected from the screen to a value of 1+A in which the greatest projector luminance and ambient light are completely reflected by screen 22 (i.e., R=1 and P=1). Because screen regions 32 may have different reflectivities R, adjacent image pixels having the same or nearly the same luminance values (after transformation in step 132) but projected onto different adjacent regions 32 may have starkly different brightness levels due to the differences in reflectivity of the adjacent regions 32. Such stark differences in the display brightness of such pixels may result in visible artifacts or boundaries between adjacent regions 32. By blending display brightnesses across regions 32 of screen 22, such visual artifacts or visual boundaries may be made less discernable or may be completely hidden. In other embodiments, step 134 may be omitted.

In one embodiment, blending of display brightnesses across screen 22 is achieved by blending display brightnesses of pixels proximate to boundaries of adjacent regions 32. Such blending further includes blending display brightnesses of pixels proximate a boundary of a region 32 with pixels proximate a center of the same region 32. In particular, the luminance value of each pixel is adjusted based upon the reflectivities of multiple regions 32 proximate or adjacent to the particular screen region 32 onto which the pixel is to be projected. To provide a smooth transition between display brightness values along edges or boundaries of regions 32, the display brightness D for pixels having the same luminance values on opposite sides of the boundary should match or at least be close to a match. To provide a smooth transition between display brightness values of pixels near the boundary of a region 32 and display brightness values near a center of a screen region 32, controller 28 further interpolates between display brightness functions of adjacent screen regions 32. In one embodiment, such interpolation is linear.

Figures 14, 15:
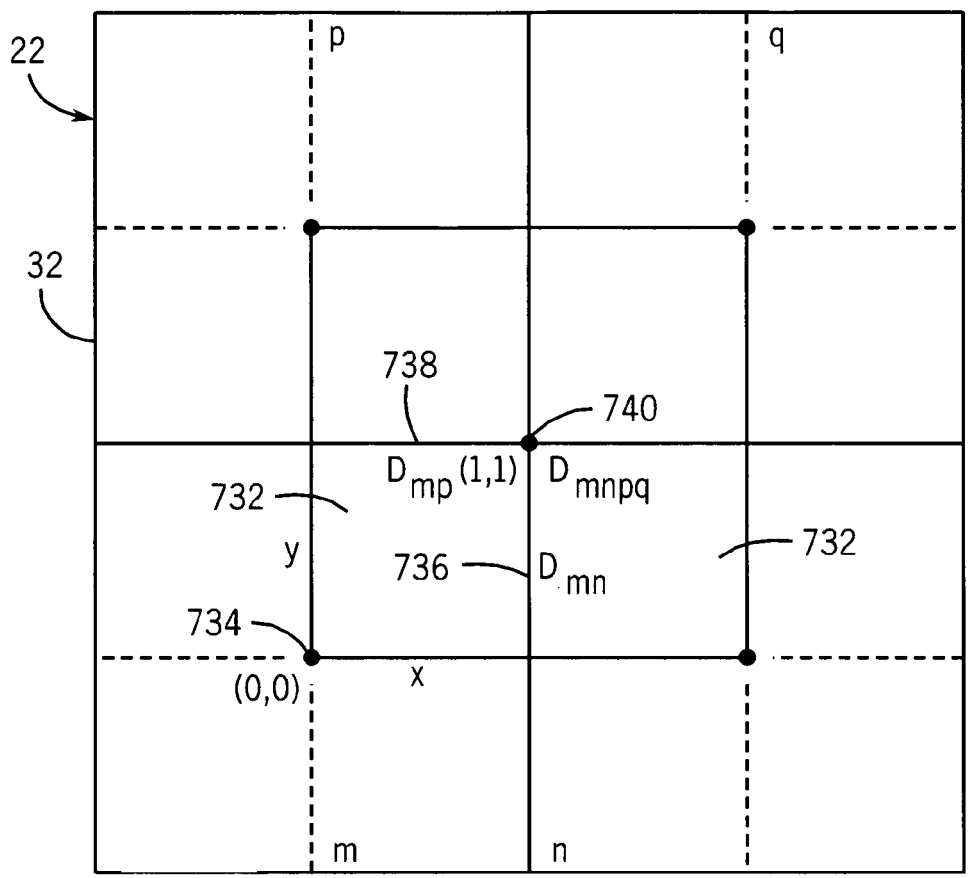
FIG. 14 is a front plan view of four adjacent regions of a screen of the system of FIG. 1 according to an example embodiment.
FIG. 15 is a flow diagram of one example of a method for blending display brightness across a screen according to an example embodiment.

FIG. 14 illustrates four example adjacent regions 32 of screen 22. In the example shown in FIG. 16, the four adjacent regions 32 are denoted by labels m, n, p and q. As further shown by FIG. 16, each of screen regions 32m, 32n, 32p and 32q are further subdivided into quadrants 732. Each quadrant 732 of each region 32 lies adjacent to a unique set of quadrants 732 and a unique set of regions 32. For example, the upper right quadrant 732 of region 32m lies adjacent to the lower right quadrant of region 32p, the lower left quadrant of region 32q and the upper left quadrant 732 of region 32n. Adjustment of the luminance value of each pixel in the upper right quadrant 732 of region 32m is adjusted based upon the reflectivities R of the adjacent region 32n, 32p and 32q. In particular, the luminance value of each pixel within the upper right quadrant 732 of region 32m is adjusted based upon its relative proximity to the center 734 of region 32m, the boundary 736 between the upper right quadrant 732 of region 32m and the upper left quadrant 732 of region 32n, the boundary 738 between the upper right quadrant 732 of region 32m and the lower right quadrant 732 of region 32p and the mutual corners 740 of the upper right quadrant 732 of region 32m and the lower left quadrant 732 of region 32q.

The luminance values of the pixels to be projected onto the upper right quadrant 732 of region 32m of screen 22 are adjusted such that pixels along boundaries 736, 738 and along corner 740 having the same unadjusted luminance values (the projection luminance P resulting from the completion of step 132 in FIG. 3) have the same or nearly the same display brightness values given the different reflectivities R of regions 32m, 32n, 32p and 32q. In the particular example illustrated, the adjustment to the luminance values of those pixels along boundaries 736, 738 and corner 740 in the upper right quadrant 732 of region 32m are the greatest. In the embodiment illustrated, the extent to which the luminance values of pixels are adjusted decreases as the location of such pixels approaches center 734. The luminance values of pixels within the upper right quadrant 732 of region 32m are adjusted so as to achieve a smooth or gradual change in the rate or extent of adjustment from those pixels proximate to borders 736, 738 and corners 740 and those pixels proximate to center 734.

Figure 16:
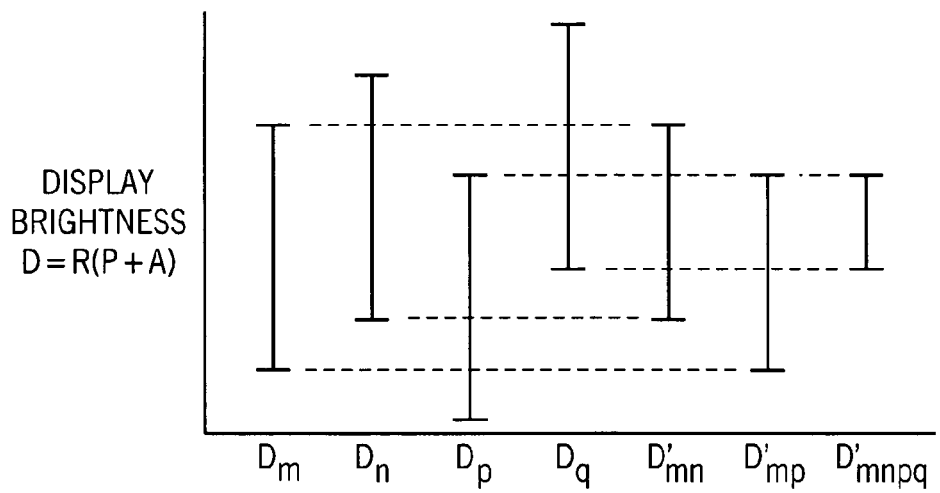
FIG. 16 is a graph illustrating one example of different display brightness ranges of adjacent screen region quadrants and corresponding mutually coextensive display brightness ranges according to an example embodiment.

FIG. 15 is a flow diagram illustrating one example of a method 820 that may be carried out by processor 90 following instructions in memory 92 (shown in FIG. 1) for blending display brightnesses across screen 22. As indicated by step 822, display brightness ranges of adjacent screen region quadrant are reduced so as to be mutually coextensive. As shown by FIG. 16, due to different reflectivities R, adjacent screen regions 32, such as regions 32m, 32n, 32p and 32q shown in FIG. 14, may have greatly different display brightness ranges. For example, in the example scenario illustrated in FIG. 16, screen regions 32p, 32m, 32n and 32q have successively larger reflectivities R which results in regions 32p, 32m, 32n and 32q having successively higher display brightness ranges. In the scenario illustrated in FIG. 16, such ranges are substantially equal to one another due to a substantially uniform ambient light level across regions 32m, 32n, 32p and 32q. In other scenarios, such ranges may be higher or lower or may be greater as compared to one another as a result of different ambient light levels across regions 32m, 32n, 32p and 32q.

Reducing display brightness ranges of adjacent screen region quadrant 732 so as to be mutually coextensive assists in meeting display conditions in each of the adjacent quadrants 732 of regions 32m, 32n, 32p and 32q. For example, pixels along border 738 in the lower right quadrant 732 of region 32p may have a designated display brightness value at the lower end of the display brightness range of region 32p such that the luminance value of a proximate pixel along border 738 within the upper right quadrant 732 of region 32m cannot be sufficiently adjusted so as to match or be sufficiently close to a pixel in region 32p due to different reflectivities R of regions 32m and 32p. By reducing or trimming the display brightness ranges of such adjacent screen region quadrants 732 so as to be mutually coextensive, the luminance values of image pixels along borders 736, 738 and corners 740 may be sufficiently adjusted to provide a smooth transition.

As shown in FIG. 16, new display brightness ranges for scaling luminance adjustments to pixels along borders 736, 738 and corners 740 are determined by controller 28. In particular, display brightness range $D_{m,n}$ constitutes a range of display brightnesses contained within the display brightness ranges of regions 32m and 32n. Display brightness range $D_{m,p}$ constitutes a range of display brightnesses contained within or mutually coextensive with the display brightness ranges of both regions 32m and 32p. Display brightness range $D_{m,n,p,q}$ constitutes a display brightness range that is contained within or mutually coextensive with the display brightness ranges of each of regions 32m, 32n, 32p and 32q.

The upper limit of $D_{m,n}$ is mathematically represented by: max $[D_{m,n}(P_{min}), R_n A, R_m A]$. The lower bound of range $D_{m,n}$ may be formulated or defined as min $[D_{m,n}(P_{max}), R_m(1+A), R_n(1+A)]$. For purposes of this disclosure, $P_{min}$ is the lowest level of luminance that may be projected by the embodiment of projector 24 used (presumed to be 0) while $P_{max}$ is the highest level of luminance that may be projected by the embodiment of projector 24 used (presumed to be 1). For purposes of this disclosure, $R_m$, $R_n$ and $R_p$ represent the reflectivities R of regions m, n and p, respectively. The value P is the transformed target luminance for a pixel resulting from the completion of step 132 (shown in FIG. 3). The reduced range $D_{m,n}$ may be quantified as:

$$D'_{m,n}(P) = \frac{D'_{max} - D'_{min}}{D_{m,n}(P_{max}) - D_{m,n}(P_{min})}[D_{m,n}(P) - D_{m,n}(P_{min})] + D'_{min}, \text{ where:}$$

$$D_{m,n}(P) = \frac{R_m[A + P_m(P)] + R_n[A + P_n(P)]}{2}$$

Likewise, the lower bound of range $D_{m,p}$ may be defined as:

$$D_{min} = \max[D_{m,p}(P_{min}), R_p A, R_m A]$$

The upper bound of range $D_{m,p}$ may be defined as:

$$D_{max} = \min[D_{m,p}(P_{max}), R_m(1+A), R_p(1+A)]$$

Accordingly, the reduced range $D_{m,p}$ may be quantified as:

$$D'_{m,p}(P) = \frac{D'_{max} - D'_{min}}{D_{m,p}(P_{max}) - D_{m,p}(P_{min})}[D_{m,p}(P) - D_{m,p}(P_{min})] + D'_{min}.$$

At corner 740, the lowest display brightness and the greatest brightness bounds are formed from the greatest brightness or brightness functions of all four adjacent regions 32m, 32n, 32p and 32q. The display brightness function may be formulated as follows:

$$D_{m,n,p,q}(T) =$$

-continued $$\frac{R_m[A + P_m(P)] + R_n[A + P_n(P)] + R_p[A + P_p(P)] + R_q[A + P_q(P)]}{4}$$

The mutually coextensive display brightness range $D_{m,n,p,q}$ has an upper bound that may be defined as:

max $[D_{m,n,p,q}(P_{min}), R_nA, R_mA, R_pA, R_qA]$ and a lower bound that may be defined as:

min $[D_{m,n,p,q}(P_{max}), R_m(1+A), R_n(1+A), R_p(1+A), R_q(1+A)]$.

The overall range $D_{m,n,p,q}$ may be formulated as follows:

$$D'_{m,n,p,q}(P) = \frac{D''_{max} - D''_{min}}{D_{m,n}(P_{max}) - D_{m,n}(P_{min})}[D_{m,n}(P) - D_{m,n}(P_{min})] + D''_{min}.$$

As indicated by step 824 in FIG. 16, upon the display brightness ranges of adjacent screen region quadrants being reduced so as to be mutually inclusive, the luminance values of image pixels are adjusted for blending. Once a display brightness value D for particular pixels has been obtained, the blended projection luminance value P' may be found by inverting the relationship:

$$D = R(P' + A)$$

$$P' = \frac{D}{R} - A.$$

In particular, the blended projection luminance value P' for a pixel to be projected onto upper right quadrant 732 of region 32$m$ may be determined based upon its proximity to center 734 (labeled 0, 0), to boundary 736 having an X abscissa value of 1, to boundary 738 having a Y ordinate value of 1 and to corner 740 having an XY abscissa/ordinate value of 1, 1, using the following equation:

$$P'_{m,n,p,q}(x, y, P) = a_{m,n,p,q}(P)x + b_{m,n,p,q}(P)y + c_{m,n,p,q}(P)xy + d_{m,n,p,q}(P),$$

$0 \leq x, y \leq 1$ where:

$$a_{m,n,p,q}(P) = \frac{D'_{m,n}(P)}{R_m} - \frac{D_m(P)}{R_m}$$

$$b_{m,n,p,q}(P) = \frac{D'_{m,p}(P)}{R_m} - \frac{D_m(P)}{R_m}$$

$$c_{m,n,p,q}(P) = \frac{D'_{m,n,p,q}(P)}{R_m} + \frac{D_m(P)}{R_m} - \frac{D'_{m,n}(P)}{R_m} - \frac{D'_{m,p}(P)}{R_m}$$

$$d_{m,n,p,q}(P) = \frac{D_m(P)}{R_m} - A.$$

The same process for further adjusting the luminance value for each pixel in the upper right quadrant 732 of region 32$m$ to blend the display brightness of such pixels with those pixels in adjacent quadrants 732 of adjacent regions 32 is carried out for each of the pixels in the other quadrant 732 of region 32$m$ as well as for each of the quadrants in the other regions 32. For those regions 32 along a perimeter of screen 22, boundary values appropriate to the perimeter are replicated from the edge parallel to the perimeter. For example, if regions 32$m$ and 32$n$ in FIG. 14 were at the top of screen 22, then $D_m$ would be used for $D_{mp}$ and $D_{mn}$ would be used for $D_{mnpq}$ during the interpolation of quadrant 730.

According to one embodiment, controller 28 performs steps 822 and 824 of method 820 (shown in FIG. 15) as follows:

(1) For each adjacent pair of screen regions 32, calculate $D'_{m,n}(P)$ and $D'_{m,p}(P)$.

(2) For each adjacent quad of screen regions 32, calculate $D'_{m,n,p,q}(P)$;

(3) Compute a, b, c, d for each quadrant of each screen region 32;

(4) From pixel row and column, determine screen region 32$m$, horizontal and vertical interpolation fractions x and y, and horizontal and vertical screen region 32. Screen region 32 neighbors n and p and diagonal q; and (5) Perform bilinear interpolation by:

(a) Looking at values for a, b, c and d for the quadrant and unadjusted luminance or pixel luminance value P; and (b) Computing P' using the bilinear formula.

Although, in the particular example illustrated, the luminance values adjusted to provide blended projection luminance values P' are the transformed target luminances (P) obtained in step 132 of method 120 (shown in FIG. 3), in other embodiments, step 136 may alternatively be performed by adjusting the original target luminances T provided as part of video input 84 (shown in FIG. 1).

Method 820 shown and described with respect to FIG. 16 is one example of a method for reducing visually discernable artifacts along the boundaries of adjacent screen regions 32 caused by their differing reflectivities. In particular embodiments, additional or alternative adjustments may be made to further reduce the discernability of boundaries between screen regions 32 in the reflected image. In one embodiment, step 128 in method 120 (shown in FIG. 3) may further include applying a low-pass filter to the average target luminances T of each image block when selecting a reflectivity for an associated screen region 32. For example, as noted above, a reflectivity R for a particular screen region 32 may be calculated as follows:

$R=T/(T+A)$, where:

R is the reflectivity of a screen region 32, where T is the average of all luminance values of pixels to be projected onto the screen region 32, and A is the ambient light value associated with the screen region 32.

In lieu of using the average of target luminances T for those pixels contained in an image block to be projected onto a particular screen region 32, the reflectivity for a particular screen region 32 may alternatively be selected using the average target luminance of those pixels in the image block 220 to be projected upon the particular screen region 32 as well as the average target luminances of those pixels to be projected onto each of the surrounding eight regions 32. For example, the reflectivity of screen region 32-3C (shown in FIG. 1) may be determined by summing the average target luminances of pixels to be projected onto screen region 32-3C (shown in FIG. 1) and the average target luminances of those pixels to be projected onto screen regions 32-2B, 32-2C, 32-2D, 32-3B, 32-3D, 32-4B, 32-4C and 32-4D and dividing this total by 9. This value $\overline{T}$ is divided by the sum of itself and the ambient light (i.e., $\overline{T}/(\overline{T}+A)$) to select a reflectivity R for screen region 32-3C. The reflectivity R for other regions 32 may be made in a similar manner. In some embodiments, the radius of regions about the region of interest to be averaged with the region of interest may be greater than one. As a result, the reflectivities R selected for adjacent screen regions 32 are closer, lessening the extent to which the display brightness ranges (shown in FIG. 17) are reduced so as to enhance contrast between luminance levels of pixels while providing blended display brightnesses across screen 22.

In addition or as an alternative to applying a low-pass filter to the average target luminances T of pixels in a particular screen region 32, a low-pass filter may also be applied to the selected reflectivities R for each screen region 32. For example, a selected reflectivity R for a particular screen region 32 may be replaced with another reflectivity value based upon an average of the reflectivity R for the particular screen region 32 and the reflectivity values R of its surrounding screen regions 32. In one embodiment, the reflectivities R of the eight surrounding screen regions 32 may be added to the reflectivity R of the particular screen region 32 and averaged to establish a new reflectivity R for the particular screen region 32. In other embodiments, the radius of screen regions 32 extending outward from the screen region 32 of interest that are used to establish a new reflectivity R for the screen region 32 of interest may be increased. By applying a low-pass filter to the reflectivity R initially selected for a particular screen region 32, the differences between the reflectivities R of adjacent screen regions 32 is reduced. This reduction enhances contrast between pixels by reducing the extent to which the display brightness range are reduced to accommodate differences between display brightness ranges of adjacent regions 32 while facilitating the reduction of visually discernable artifacts along the boundaries of adjacent regions.

In addition to the aforementioned adjustments or as an alternative adjustment, further adjustments may be made to step 132 (shown in FIG. 3) to further reduce the likelihood of visually discernable artifacts along the boundaries of adjacent screen regions 32. According to one embodiment, a low-pass filter is applied to the number of pixels having target luminances T within each of regimes 622, 624 and 626 (shown in FIG. 13) when determining transforms 650, 660, 664 or 668 (shown in FIG. 14). For example, in lieu of determining transforms 650, 660, 664, 668 based upon the number of pixels in a single image block 220 having target luminances T within each of regimes 622, 624, 626, transforms 650, 660, 664, 668 (shown in FIG. 14) may alternatively be determined based upon an average of the number of pixels in multiple blocks 220 having target luminances T within the respective regimes 622, 624, 626. For example, when determining transforms 650 and 660 (shown in FIG. 13), in lieu of using $n_L$ from the image block containing the particular pixel to be projected, transforms 650 and 660 may alternatively be determined using an average of $n_L$ amounts from a particular image block containing the pixel and the number of pixels ($n_L$) in regime 622 from the surrounding image blocks 220. The radius of image blocks 220 that may be averaged with the image block containing the pixel being transformed may be greater than one image block 220 in some embodiments. With such an adjustment, visually discernable artifacts along boundaries caused by differences between the transforms applied to pixels to be projected onto adjacent screen regions are reduced. In other embodiments, other adjustments may be made to reduce visually discernable artifacts or boundaries of images reflected from screen 22 caused by different reflectivities R of regions 32.

As indicated by step 136 in FIG. 3, method 120 further transforms chrominances or color values of pixels in each projection block 220 based upon the particular reflectivity value R of the associated screen region 32 and the ambient light value A associated with the screen region 32 upon which the particular projection block 220 is aligned and to be projected upon. By transforming or adjusting chrominances of pixels in each block based upon the selected reflectivity and ambient light for the associated screen region 32, method 120 reduces the likelihood of colors becoming washed out by such ambient light. In one embodiment, such color compensation is performed using color components in CIELAB 76 coordinates to maintain the same hue while increasing chromaticity in proportion to the increase in luminance as a result of ambient light. In one embodiment, the chrominance of pixels are adjusted or transformed according to the following:

$a^*(P_{ij}) = f_{ij} a^*(T_{ij})$ and $b^*(P_{ij}) = f_{ij} b^*(T_{ij})$, where:

$f_{ij} = (L^*(R(P_{ij}+A))/(L^*(R(T_{ij}+A))))$ which is approximately equal to $\sqrt[3]{(P_{ij}+A)/(T_{ij}+A)}$;

R=reflectivity of the screen,

A=a light value, $P_{ij}$=a projection luminance P of a pixel having coordinates ij, and $T_{ij}$=target luminance of a pixel having coordinates ij.

As a result, since CIELAB is based on the cube roots of XYZ tri-stimulus values:

$X'_{ij} = (\sqrt[3]{P_{ij}} + f_{ij}(\sqrt[3]{X_{ij}} - \sqrt[3]{T_{ij}}))^3$; and $Z'_{ij} = (\sqrt[3]{P_{ij}} + f_{ij}(\sqrt[3]{Z_{ij}} - \sqrt[3]{T_{ij}}))^3$ for each pixel.

In other embodiments, other mappings of the gamut may be utilized.

As indicated by step 138, controller 28 generates control signals directing projector 24 to project projection blocks 220 onto screen 22. As noted above, each of regions 32 of screen 22 may have a different reflectivity as provided for in step 130 described above. In one embodiment, controller 28 may additionally be in communication with screen 22 and the ambient light source 26 such that it generates control signals synchronizing screen 22 to an ambient light source 26. In particular, controller 28 generates control signals changing region 32 between the first reflective state in which regions 32 have the reflectivity selected in step 130 and a second lesser reflective state. Likewise, controller 28 may generate control signals changing ambient light source 26 between a first state of brightness and a second greater state of brightness. In such embodiment, control 28 changes or actuates between its different reflective states and ambient light source 26 between brightness states in a timed fashion relative to one another. In one embodiment, controller 28 generates control signals such that screen 22 and ambient light source 26 both flicker or modulate between their different states at a frequency greater than a flicker fusion frequency of a human eye. In one embodiment, controller 28 generates control signals such that screen 22 and ambient light source 26 change between their states at a frequency of at least 50 Hertz.

Figure 17:
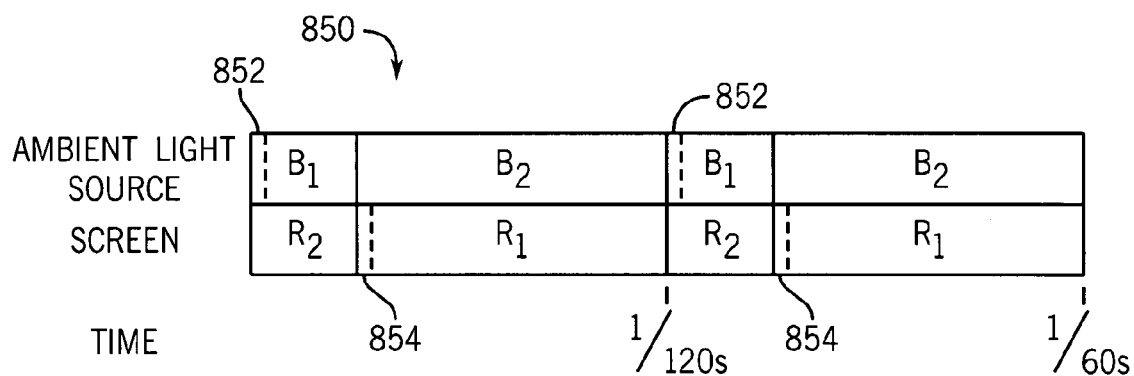
FIG. 17 illustrates one example of a synchronization timing sequence that may be employed by the projection system of FIG. 1 according to one example embodiment.

FIG. 17 illustrates one example of a synchronization timing sequence 850 that may be employed by controller 28. As shown in FIG. 17, controller 28 generates control signals flickering or modulating light source 26 on screen 22 such that light source 26 is in the first greater brightness state $B_1$ while screen 22 is in the second lesser reflectivity state $R_2$ (reflectivity state $R_2$ having a lesser reflectivity as compared to the selected reflectivity as compared to the reflectivity selected in step 130 described with respect to FIG. 3). Controller 28 further flickers or modulates light source 26 and screen 22 such that light source 26 is in the second lesser brightness state $B_2$ while each of regions 32 of screen 22 are in their first greater reflectivity state $R_1$ (the selected reflectivity chosen in step 130 for each of individual regions 32). As a result, when light source 26 is in the second greater brightness state $B_1$, regions 32 of screen 22 absorb a greater percentage of such light. When light source 26 is in the second lesser brightness state $B_2$, regions 32 of screen 22 reflect a greater percentage of light projected by projector 24. Consequently, ambient lighting level in the environment of screen 22 may be maintained without the image projected onto screen 22 by projector 24 being as washed out as the image would be without such synchronization. In other words, contrast is maintained in the presence of ambient light.

In the particular example illustrated in FIG. 17, controller 28 generates control signals such that light source 26 is in the second lesser brightness state $B_2$ a greater percentage of time as compared to the first greater brightness state $B_1$. Likewise, region 32 of screen 22 are in the first greater reflectivity state $R_1$ a greater percentage of time as compared to the second lesser reflectivity state $R_2$. Because regions 32 of screen 22 are in the first greater reflectivity state $R_1$ for a greater percentage of time as compared to the second lesser reflectivity state, and because ambient light source 26 is in the second lesser brightness state $B_2$ a greater percentage of time as compared to the first brightness state $B_1$, more light from projector 24 is reflected by screen 22 and less ambient light is reflected off of screen 22. As a result, the image reflected off of screen 22 and viewed by an observer has enhanced contrast and greater brightness. In other embodiments, the percentages of time at which screen 22 and light source 26 are in their respective states may be varied.

FIG. 17 further illustrates a variation upon synchronization timing sequence 850. In particular embodiments, screen 22 may transition between the first greater reflectivity state $R_1$ and the second lesser reflectivity state $R_2$ slower than the rate at which ambient light source 26 is able to transition from the lesser bright state $B_2$ to the greater bright state $B_1$. If screen 22 is not in a sufficiently light absorbing state when ambient light source 26 completes its transition to the first greater bright state $B_1$, an excessive amount of ambient light may be unintentionally reflected off of screen 22, potentially reducing image quality. As shown by FIG. 17, timing sequence 850 may be slightly modified to include guard bands 852 (illustrated by dashed lines succeeding the previous time at which ambient light source 26 was to transition to the greater bright state $B_1$). Guard bands 852 comprise periods of time that elapse after screen 22 is to complete its transition to the second lesser reflectivity state $R_2$ before ambient light source begins its transition to the greater bright state $B_1$. In other words, guard bands 852 provide tolerance to sequence 850 to accommodate potentially slower response times of screen 22. Such guard bands 852 may also be employed in sequence 860 shown and described with respect to FIG. 18 or in other synchronization timing sequences between ambient light source 26 and screen 22.

FIG. 17 also illustrates a reverse scenario in which ambient light source 26 transitions between the first greater bright state $B_1$ and the second lesser bright state $B_2$ is slower than the rate at which screen 22 is able to transition from a second lesser reflectivity state $R_2$ to the first greater reflectivity state $R_1$. If light from ambient light source 26 is not sufficiently darkened, cut off or terminated when screen 22 completes its transition to the first greater reflectivity state $R_1$, an excessive amount of ambient light may be unintentionally reflected off of screen 22, potentially reducing image quality. As further shown by FIG. 17, timing sequence 850 may be slightly modified to additionally include guard bands 854 (illustrated by dashed line succeeding the previous time at which screen 22 was to transition to the first greater reflectivity state $R_1$). Guard bands 854 comprise periods of time that elapse after ambient light source 26 is to complete its transition to the second lesser bright state $B_2$ before screen 22 begins its transition to the greater reflectivity state $R_1$. Guard bands provide tolerance to sequence 850 to accommodate potentially slower response times for ambient light source 26. Like guard bands 852, guard bands 854 may also be employed in sequence 860 shown and described with respect to FIG. 18 or in other synchronization timing sequences between ambient light source 26 and screen 22.

Figure 18:
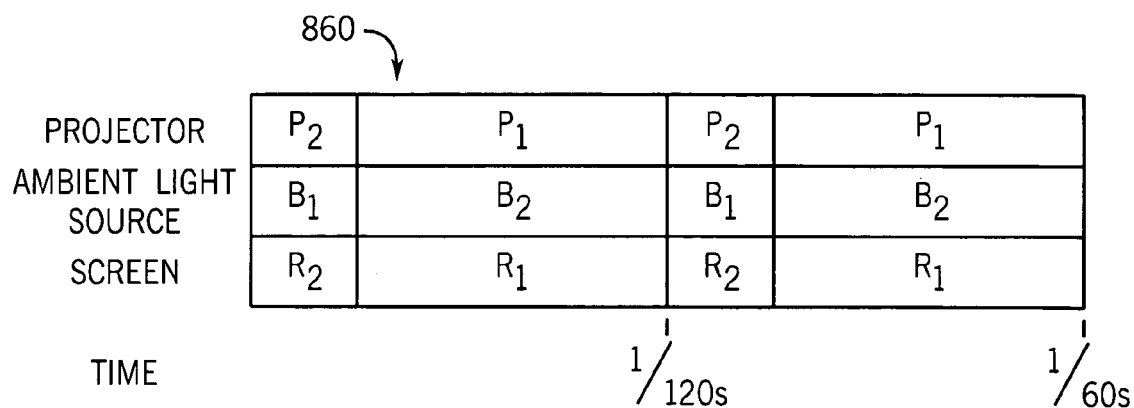
FIG. 18 illustrates another example of a synchronization timing sequence that may be employed by the projection system of FIG. 1 according to one example embodiment.

FIG. 18 illustrates one example of a synchronization timing sequence 860 that may be utilized by controller 28 to synchronize operation of projector 24 with ambient light source 26 with screen 22. As shown by FIG. 18, projector 24 flickers or modulates between a first projecting state P1 in which light projected by projector 24 has a first greater intensity and a second projecting state P2 in which light projected by projector 24 has a lesser intensity (including a zero intensity, i.e. when no light is projected by projector 24). As further shown by FIG. 18, modulation of projector 24 between the first projection state and the second projection state is synchronized with the modulation of ambient light source 26 between the second brightness state B2 and the first brightness state B1 and with the modulation of screen 22 between the first reflectivity state $R_1$ and the second reflectivity state R2. Like ambient light source 26 and screen 22, projector 24 modulates between the first and second projection states at a frequency greater than or equal to the flicker fusion frequency of a human eye (nominally about 50 hertz). In the particular example shown, projector flickers at a frequency of approximately 120 hertz and is in the first projection state P1 while ambient light source 26 is in the second brightness state B2 and while screen 22 is in the first reflectivity state $R_1$.

Because projector 24 is modulated in synchronization with screen 22 and ambient light source 26, the light source of projector 24 may be cooled or otherwise be allowed to rest during the second projection state P2, allowing the light source to be overdriven so as to emit a greater intensity light than would otherwise be achievable during the first projection state P1 without exceeding or substantially exceeding an average power rating of the light source. As a result, the brightness or intensity of the image projected by projector 24 may be greater without the use of higher intensity and generally more expensive light sources in projector 24. Because projector 24 may rest or be modulated so as to not project light during projection state P2, energy savings may result. At the same time, the quality of the projected image viewed by an observer does not generally suffer since light that would be projected by projector 24 during projection state P2 would otherwise be absorbed by screen 22 in the second lesser reflectivity R2 rather than being substantially reflected.

As indicated by step 140 in FIG. 3, during the projection of each projection area or frame of blocks 220, controller 28 may verify alignment of projection blocks 220 with regions 32 of screen 22. In one embodiment, controller 28 generates control signals directing projector 24 to project a predetermined image pattern against a predetermined pattern of screen reflectivities R across regions 32 and verifying that the results and intensities or luminances across projection area 68 are as expected. For example, controller 28 may generate control signals directing projector 24 to project light such that one or more pixels having a predetermined luminance impinge upon one or more sensors 23 of screen 22. If signals from such sensors 23 do not correspond to blended projection luminances P' of the particular pixels, controller 28 determines that projection blocks 220 of projection area 68 have become misaligned with screen regions 32. In such a scenario, method 320 (shown and described with respect to FIG. 4) or method 420 (shown and described with respect to FIG. 8) may be once again performed.

As indicated by step 142 in FIG. 3, controller 28 determines from video input 84 (shown in FIG. 1) whether the image or images being displayed are at an end, such as when a single still image is to be displayed or such as when an end of a video or animation has been completed. If additional frames or images are to be subsequently projected upon screen 22, as indicated by arrow 142, steps 128-136 are once again repeated for each projection block 220 of the subsequent image or frame that would be projected as projection area 68. Otherwise, as indicated by step 144, method 120 is completed.

Overall, method 120 (shown and described with respect to FIG. 3) facilitates enhanced viewing of a projected image in the presence of ambient light. Step 122 facilitates partitioning and alignment of a projection area into blocks aligned with screen regions 32. As a result, screen regions and their associated projection blocks may be coordinated with one another to enhance contrast of the pixels in the projection block 220 in the presence of ambient light. Steps 124-132 facilitate selection of reflectivity for screen regions 32 and further facilitate transformation of target luminances of image pixels based upon the selective reflectivity for the corresponding projection block and the ambient light value sensed or input for the corresponding region. Step 134 enables chrominances of such pixels to be transformed or adjusted to maintain the same hue while increasing their chromaticity in proportion to the luminance adjustments made in step 132. Step 136 reduces or minimizes visually discernable boundaries or artifacts between adjacent screen regions 32 which may be caused by different levels of reflectivity.

Although method 120 illustrated in FIG. 3 has been described as including the steps of partitioning (1) a projection area into image blocks aligned with screen regions (step 122), (2) transforming luminance of image pixels in each projection block (step 132) and (3) blending display brightness across screen (step 134), in other embodiments, such individual processes may be performed independently of one another. For example, in one embodiment, screen 22 may include a single region 32 upon which the entire projection area is projected. In such an embodiment, the reflectivity of the single screen region may be selected per step 130 and luminance's of the image pixels in the entire projection area may be transformed per step 132 without partitioning the projection area into blocks per step 122 and without blending display brightness across the screen per step 134. In yet another embodiment, method 120 may omit step 134. In yet another embodiment, method 120 may omit step 132 or step 136. Likewise, in particular embodiments, method 120 may project the projection blocks or block per step 138 without changing or modulating the reflectivity of the screen in synchronization with changing or modulating the brightness of an ambient light source. Various combinations of the steps of method 120 may be utilized to provide enhanced image quality.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
   receiving image data, the image data including target luminances of image pixels within the image data, the target luminances being ideal luminances that do not take into account variances in screen reflectivity;
   selecting a reflectivity for a screen, the reflectivity for the screen being selected based on ambient light and an average of the target luminances of the image pixels;
   transforming the target luminances of the image pixels to projection luminances, the projection luminance representing luminance produced by a projector, wherein the transformation of target luminances to projection luminances is performed by using the reflectivity selected.

2. The method of claim 1, wherein the screen includes regions and wherein the method further comprises:
   selecting different reflectivities for different regions; and
   transforming target luminances of the image pixels to be projected onto different regions to projection luminances differently using the different reflectivities of the different regions.

3. The method of claim 1, wherein transforming of a target luminance of an individual pixel additionally uses target luminances of other of the image pixels.

4. The method of claim 1, wherein the transforming of the image pixels is based upon available luminance levels of a projector.

5. The method of claim 4, wherein the available luminance levels of the projector are apportioned amongst the projection luminances of the image pixels.

6. The method of claim 1, including sensing the light value, with the light value including an ambient light value.

7. The method of claim 1, including inputting the light value corresponding to an ambient light value.

8. The method of claim 1, including selecting the light value corresponding to an ambient light value.

9. The method of claim 1, wherein the image pixels are assigned to regimes using the target luminances of the image pixels, the light value and the reflectivity of the screen.

10. The method of claim 9 further comprising applying different transforms to the target luminances of the image pixels in different of the regimes to transform the target luminances to the projected luminances.

11. The method of claim 10, wherein the different transforms are scaled based upon a relative distribution of the target luminances of the image pixels among the regimes.

12. The method of claim 1 wherein the image pixels are assigned into regimes using target luminances of the image pixels, the ambient light value and the reflectivity of the screen and wherein the reflectivity of the screen is selected to set a number of the image pixels in one or more selected of the regimes to a highest active number.

13. The method of claim 1 wherein the reflectivity is selected according to the following:

$R=T/(T+A)$, where:

R is the reflectivity of the screen;
T is average target luminance of the image pixels; and
A is the light value corresponding to an ambient light value.

14. The method of claim 1, further comprising:
   changing the screen between the reflectivity selected and a lesser reflectivity; and
   changing a light source between a first brightness state, occurring during the reflectivity selected for the screen, and a second greater brightness state, occurring during the lesser reflectivity of the screen.

15. The method of claim 14 wherein the changing of the screen in the light source occurs at a frequency greater than or equal to a flicker fusion frequency of observers.

16. A method of claim 1 wherein the reflectivity selected is based upon a statistical compilation of target luminances of the image pixels.

17. The method of claim 1, wherein the target luminances of the image pixels are transformed to projection luminances prior to projection of the image pixels onto the screen.

18. An apparatus comprising:
a controller configured to select a first reflectivity state for at least a portion of a screen based upon ambient light and an average of target luminances of image pixels to be projected upon the portion of the screen and configured to adjust intensity of light projected onto the screen by transforming the target luminances of the image pixels to projection luminances based upon a first brightness state of a light source and the first reflectivity state selected.

19. The apparatus of claim 18, wherein the controller is configured to generate control signals configured to direct a projector to project the image pixels at their corresponding projection luminances.

20. The apparatus of claim 18, wherein the controller is configured to change a screen between the first reflectivity state and a second reflectivity state, having a lower reflectivity than the first reflective state, and wherein the controller is configured to generate control signals configured to change the light source between the first brightness state, occurring during the first reflective state, and a second greater brightness state, occurring during the second reflective state.

21. The apparatus of claim 18, further comprising an input configured to receive operator input corresponding to the first brightness state.

22. The apparatus of claim 18, further comprising a sensor configured to sense the first brightness state.

23. The apparatus of claim 18, further comprising a light source, wherein the controller is configured to generate control signals and wherein the light source provides light at the first brightness state in response to the control signals.

24. The apparatus of claim 18, wherein the first reflectivity state is for a first region of a screen, wherein the controller is configured to generate a second reflectivity state for a second region of the screen and wherein the controller is configured to transform target luminances of image pixels to be projected onto the first region to projection luminances based upon the first brightness state and the selected first reflectivity state and to transform target luminances of image pixels to be projected onto the second region to projection luminances based upon the first brightness state and the second reflectivity state.

25. The apparatus of claim 18, wherein the first reflective state is selected based upon the first brightness state.

26. The apparatus of claim 18, further comprising: a self-contained unit comprising:
the controller;
a first interface in communication with the controller and configured to receive image data for the image pixels; and
a second interface in communication with the controller and configured to facilitate communication of projection luminances of image pixels to a projector.

27. The apparatus of claim 26, further comprising a third interface in communication with the controller and configured to facilitate communication of selected reflectivities to a screen.

28. The apparatus of claim 27, further comprising a fourth interface in communication with the controller and configured to facilitate communication with a light source, wherein the controller is further configured to generate control signals configured to change the light source between the first brightness state, occurring during the first reflective state, and a second greater brightness state, occurring during the second reflective state.

29. The apparatus of claim 18, wherein the controller is configured to transform the target luminances of the image pixels to projection luminances prior to projection of the image pixels onto the screen.

30. A non-transitory computer readable medium comprising: instructions to select a reflectivity for a screen. The reflectivity for the screen being selected based on ambient light and an average of target luminances of image pixel; and instructions to adjust intensity of light projected onto the screen by transforming the target luminances of the image pixels to projection luminances using the reflectivity selected.

31. The non-transitory computer readable medium of claim 30, wherein the screen includes regions and wherein the medium further comprises instructions to select different reflectivities for different regions; and instructions to transform target luminances of image pixels to be projected onto the different regions to projection luminances differently based upon the different reflectivities of the different regions.

32. An apparatus comprising:
means for selecting a reflectivity for a screen, the reflectivity for the screen being selected based on ambient light and an average of target luminances of image pixels; and
means for adjusting intensity of light projected onto the screen by transforming the target luminances of the image pixels to projection luminances based upon the reflectivity selected.

* * * * *

UNITED STATES PATENT AND TRADEMARK OFFICE
CERTIFICATE OF CORRECTION

| | | |
|---|---|---|
| PATENT NO. | : 8,130,184 B2 | Page 1 of 1 |
| APPLICATION NO. | : 11/255514 | |
| DATED | : March 6, 2012 | |
| INVENTOR(S) | : Grant K. Garner et al. | |

It is certified that error appears in the above-identified patent and that said Letters Patent is hereby corrected as shown below:

In column 29, line 6, in Claim 36, delete "A" and insert -- The --, therefor.

In column 30, line 29, in Claim 30, delete "screen. The" and insert -- screen, the --, therefor.

In column 30, line 31, in Claim 30, delete "pixel;" and insert -- pixels; --, therefor.

Signed and Sealed this
Eleventh Day of December, 2012

David J. Kappos
*Director of the United States Patent and Trademark Office*